US012154498B2

(12) United States Patent
Li

(10) Patent No.: US 12,154,498 B2
(45) Date of Patent: Nov. 26, 2024

(54) DISPLAY PANEL

(71) Applicant: WUHAN CHINA STAR OPTOELECTRONICS SEMICONDUCTOR DISPLAY TECHNOLOGY CO., LTD., Wuhan (CN)

(72) Inventor: Bo Li, Wuhan (CN)

(73) Assignee: WUHAN CHINA STAR OPTOELECTRONICS SEMICONDUCTOR DISPLAY TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 17/419,277

(22) PCT Filed: May 31, 2021

(86) PCT No.: PCT/CN2021/097505
§ 371 (c)(1),
(2) Date: Jun. 28, 2021

(87) PCT Pub. No.: WO2022/241834
PCT Pub. Date: Nov. 24, 2022

(65) Prior Publication Data

US 2024/0013715 A1 Jan. 11, 2024

(30) Foreign Application Priority Data

May 21, 2021 (CN) ......................... 202110560321.7

(51) Int. Cl.
*G09G 3/3233* (2016.01)
*G09G 3/32* (2016.01)

(52) U.S. Cl.
CPC ............. *G09G 3/3233* (2013.01); *G09G 3/32* (2013.01); *G09G 2320/0247* (2013.01); *G09G 2330/021* (2013.01)

(58) Field of Classification Search
CPC ................... G09G 3/3233; G09G 3/32; G09G 2320/0247; G09G 2330/021
See application file for complete search history.

(56) References Cited

U.S. PATENT DOCUMENTS

| | | | | |
|---|---|---|---|---|
| 2004/0252250 | A1 | 12/2004 | Yang et al. | |
| 2015/0008395 | A1 | 1/2015 | Yoon et al. | |
| 2023/0138675 | A1 * | 5/2023 | Xia ......................... | G09G 3/32 |

FOREIGN PATENT DOCUMENTS

| | | | |
|---|---|---|---|
| CN | 105204252 | A | 12/2015 |
| CN | 208173203 | U | 11/2018 |

(Continued)

OTHER PUBLICATIONS

Translation of CN 112447856A (Year: 2021).*

(Continued)

*Primary Examiner* — Lixi C Simpson
(74) *Attorney, Agent, or Firm* — PV IP PC; Wei Te Chung

(57) ABSTRACT

The present application provides a display panel. The display panel includes a substrate; and a pixel driving circuit layer including a plurality of pixel driving circuits, wherein each of the pixel driving circuits includes a first capacitor and a second capacitor that are arranged on a same metal layer, so as to achieve low-frequency display, and meanwhile reduce power consumption of the pixel driving circuits.

15 Claims, 18 Drawing Sheets

(56) References Cited

FOREIGN PATENT DOCUMENTS

| | | | | | |
|---|---|---|---|---|---|
| CN | 111063294 | A | | 4/2020 | |
| CN | 111179742 | A | | 5/2020 | |
| CN | 111584554 | A | | 8/2020 | |
| CN | 111863837 | A | | 10/2020 | |
| CN | 112071268 | A | | 12/2020 | |
| CN | 112234091 | A | * | 1/2021 | ........... G09G 3/3225 |
| CN | 112397565 | A | | 2/2021 | |
| CN | 112447856 | A | * | 3/2021 | ......... H01L 21/3065 |
| CN | 112562588 | A | | 3/2021 | |
| CN | 112713157 | A | | 4/2021 | |
| CN | 112802883 | A | | 5/2021 | |

OTHER PUBLICATIONS

Translation of CN 112234091 A (Year: 2021).*

International Search Report in International application No. PCT/CN2021/097505,mailed on Jan. 26, 2022.

Written Opinion of the International Search Authority in International application No. PCT/CN2021/097505,mailed on Jan. 26, 2022.

Chinese Office Action issued in corresponding Chinese Patent Application No. 202110560321.7 dated Jun. 23, 2022, pp. 1-8.

* cited by examiner

DISPLAY PANEL

RELATED APPLICATIONS

This application is a Notional Phase of PCT Patent Application No. PCT/CN2021/097505 having international filing date of May 31, 2021, which claims the benefit of priority of Chinese Patent Application No. 202110560321.7 filed on May 21, 2021. The contents of the above applications are all incorporated by reference as if fully set forth herein in their entirety.

BACKGROUND OF INVENTION

Field of Invention

The present application relates to the display field, and in particular to a display panel.

Description of Prior Art

With the development of display technology, organic light-emitting diode (OLED) display devices have become more and more widely used. Compared with liquid crystal displays, OLED displays have advantages such as low energy consumption, low production cost, self-luminescence, wide viewing angle, fast response speed, and so on. At present, in the field of flat panel displays such as mobile phones, personal digital assistants (PDAs), digital cameras, and the like, OLED displays have begun to replace traditional liquid crystal displays (LCDs). Pixel circuit design is a core of OLED displays and has important research significance.

In an existing seven transistors and one capacitor (7T1C) circuit structure, since thin film transistors in a pixel circuit are usually formed by a low temperature poly-silicon (LTPS) process, and leakage current of the thin film transistors formed by the LTPS process is relatively large, problems such as flicker and high power consumption easily occur during low-frequency display, thereby impacting the display quality.

SUMMARY OF INVENTION

An embodiment of the present application provides a display panel to reduce power consumption of a pixel driving circuit.

In order to realize the above-mentioned function, technical solutions provided by the present application are as follows:

The present application provides a display panel, including:

a substrate; and a pixel driving circuit layer including a plurality of pixel driving circuits, wherein each of the pixel driving circuits includes a first capacitor and a second capacitor, wherein the pixel driving circuit layer includes: a first semiconductor layer, a first metal layer, a second metal layer, a second semiconductor layer, a third metal layer, and a fourth metal layer stacked on the substrate in sequence;

wherein the fourth metal layer includes a first source, a first drain, a second source, and a second drain, the first source and the first drain are electrically connected to the first semiconductor layer, the second source and the second drain are electrically connected to the second semiconductor layer, and the second semiconductor layer is an oxide semiconductor layer; and wherein each of the first capacitor and the second capacitor has a capacitor electrode disposed in the second metal layer.

In the display panel provided by the present application, the first metal layer includes a first capacitor electrode, and the second metal layer includes a second capacitor electrode; or the second metal layer includes the first capacitor electrode, and the third metal layer includes the second capacitor electrode; and wherein the first capacitor electrode and the second capacitor electrode form the first capacitor, and the second capacitor electrode is electrically connected to the fourth metal layer.

In the display panel provided by the present application, the display panel further includes a first interlayer dielectric layer disposed between the second metal layer and the second semiconductor layer, a third insulating layer disposed between the second semiconductor layer and the third metal layer, and a second interlayer dielectric layer disposed between the third metal layer and the fourth metal layer.

In the display panel provided by the present application, the display panel is provided with a first via hole penetrating through the second interlayer dielectric layer, the third insulating layer, and the first interlayer dielectric layer; and wherein the fourth metal layer is electrically connected to the second capacitor electrode through the first via hole.

In the display panel provided by the present application, the display panel is provided with a first via hole penetrating through the second interlayer dielectric layer; and wherein the fourth metal layer is electrically connected to the second capacitor electrode through the first via hole.

In the display panel provided by the present application, the display panel further includes a first insulating layer disposed between the first semiconductor layer and the first metal layer, and a second insulating layer disposed between the first metal layer and the second metal layer; and wherein the first metal layer further includes a first gate and a third capacitor electrode, the second metal layer further includes a fourth capacitor electrode, and the third metal layer further includes a third gate, wherein the third capacitor electrode and the fourth capacitor electrode form the second capacitor.

In the display panel provided by the present application, the display panel further includes a third semiconductor layer spaced apart from and disposed in a same layer as the second semiconductor layer, and the third semiconductor layer is electrically connected to the fourth metal layer; and wherein a projection of the third semiconductor layer on the substrate at least partially overlaps a projection of an overlapping area between the first capacitor electrode and the second capacitor electrode on the substrate.

8. The display panel according to 7, wherein the first semiconductor layer is a polysilicon semiconductor layer, and the third semiconductor layer is an oxide semiconductor layer.

In the display panel provided by the present application, the display panel further includes a plurality of light-emitting devices arranged in an array and a pixel driving circuit for driving the light-emitting devices to emit light, and the pixel driving circuit includes a first initialization transistor, a switching transistor, a driving transistor, a compensation transistor, a second initialization transistor, a first light-emitting control transistor, a second light-emitting control transistor, the first capacitor, and the second capacitor;

wherein a gate of the driving transistor is connected to a first node, a first terminal of the driving transistor is connected to a third node, and a second terminal of the driving transistor is connected to a second node;

a gate of the switching transistor is connected to a second scan signal, a first terminal of the switching transistor is connected to the data signal, and a second terminal of the switching transistor is connected to the second node;

a gate of the compensation transistor is connected to the second scan signal, and a first terminal of the compensation transistor is connected to the third node, a second terminal of the compensation transistor is connected to the first node;

a gate of the first initialization transistor is connected to a first scan signal, a first terminal of the first initialization transistor is connected to a second initialization signal, and a second terminal of the first initialization transistor is connected to the first node;

a gate of the first light-emitting control transistor is connected to a light-emitting control signal, a first terminal of the first light-emitting control transistor is connected to a fifth node, a second terminal of the first light-emitting control transistor is connected to the second node, and the first light-emitting control transistor is connected to a power high-potential signal line through the fifth node;

a gate of the second light-emitting control transistor is connected to the light-emitting control signal, a first terminal of the second light-emitting control transistor is connected to the third node, and a second terminal of the second light-emitting control transistor is connected to a fourth node;

a gate of the second initialization transistor is connected to the second scan signal, a first terminal of the second initialization transistor is connected to the fourth node, and a second terminal of the second initialization transistor is connected to a first initialization signal;

the first capacitor electrode of the first capacitor is connected to the gate of the switching transistor, and the second capacitor electrode of the first capacitor is connected to the first node; and the third capacitor electrode of the second capacitor is connected to the fifth node, the fourth capacitor electrode of the second capacitor is connected to the first node, and the second capacitor is connected to the power high-potential signal line through the fifth node.

In the display panel provided by the present application, the compensation transistor, the first initialization transistor, and the second initialization transistor are oxide transistors; and the switching transistor, the driving transistor, the first light-emitting control transistor, and the second light-emitting control transistor are low temperature polysilicon transistors.

The present application also provides another display panel. The display panel includes a plurality of light-emitting devices arranged in an array and a pixel driving circuit for driving the light-emitting devices to emit light, and the pixel driving circuit includes:

a first initialization transistor configured to input a second initialization signal to a first node under control of a first scan signal;

a switching transistor configured to input a data signal to a second node under control of the second scan signal;

a driving transistor for driving the light-emitting devices to emit light under control of potentials of the first node and the second node;

a compensation transistor connected to the driving transistor through the first node and a third node, and configured to compensate a threshold voltage of the driving transistor under control of a third scan signal;

a second initialization transistor configured to input a first initialization signal to an anode of the light-emitting devices under control of a second scan signal;

a first light-emitting control transistor connected to the driving transistor through the second node, and configured to turn on a current flowing from a power high-potential signal line to the driving transistor under control of a light-emitting control signal;

a second light-emitting control transistor connected to the driving transistor through the third node, and configured to turn on a current flowing from the driving transistor to the anode of the light-emitting devices under control of the light-emitting control signal;

a first capacitor coupled between the first node and a gate of the switching transistor, and configured to reduce a potential of the first node; and a second capacitor connected to the driving transistor through the first node, and connected to the power high-potential signal line through a fourth node, and configured to store a data signal, wherein the first capacitor includes a first capacitor electrode and a second capacitor electrode disposed opposite to each other, the first capacitor electrode is electrically connected to the gate of the switching transistor, and the second capacitor electrode is electrically connected to the first initialization transistor through the first node, wherein the switching transistor is a low temperature polysilicon transistor, and the first initialization transistor is an oxide transistor.

In the display panel provided by the present application, a gate of the driving transistor is connected to a first node, a first terminal of the driving transistor is connected to a third node, and a second terminal of the driving transistor is connected to a second node;

a gate of the switching transistor is connected to a second scan signal, a first terminal of the switching transistor is connected to the data signal, and a second terminal of the switching transistor is connected to the second node;

a gate of the compensation transistor is connected to the second scan signal, and a first terminal of the compensation transistor is connected to the third node, a second terminal of the compensation transistor is connected to the first node;

a gate of the first initialization transistor is connected to a first scan signal, a first terminal of the first initialization transistor is connected to a second initialization signal, and a second terminal of the first initialization transistor is connected to the first node;

a gate of the first light-emitting control transistor is connected to a light-emitting control signal, a first terminal of the first light-emitting control transistor is connected to a fifth node, a second terminal of the first light-emitting control transistor is connected to the second node, and the first light-emitting control transistor is connected to a power high-potential signal line through the fifth node;

a gate of the second light-emitting control transistor is connected to the light-emitting control signal, a first terminal of the second light-emitting control transistor is connected to the third node, and a second terminal of the second light-emitting control transistor is connected to a fourth node;

a gate of the second initialization transistor is connected to the second scan signal, a first terminal of the second initialization transistor is connected to the fourth node, and a second terminal of the second initialization transistor is connected to a first initialization signal;

the first capacitor electrode of the first capacitor is connected to the gate of the switching transistor, and the second capacitor electrode of the first capacitor is connected to the first node; and the third capacitor electrode of the second capacitor is connected to the fifth node, the fourth capacitor electrode of the second capacitor is connected to the first node, and the second capacitor is connected to the power high-potential signal line through the fifth node.

In the display panel provided by the present application, the compensation transistor and the second initialization transistor are oxide transistors; and the driving transistor, the first light-emitting control transistor, and the second light-emitting control transistor are low temperature polysilicon transistors.

In the display panel provided by the present application, the display panel further includes:

a substrate; and a pixel driving circuit layer including a plurality of pixel driving circuits, wherein each of the pixel driving circuits includes a first capacitor and a second capacitor, wherein the pixel driving circuit layer includes: a first semiconductor layer, a first metal layer, a second metal layer, a second semiconductor layer, a third metal layer, and a fourth metal layer stacked on the substrate in sequence;

wherein the fourth metal layer includes a first source, a first drain, a second source, and a second drain, the first source and the first drain are electrically connected to the first semiconductor layer, the second source and the second drain are electrically connected to the second semiconductor layer, and the second semiconductor layer is an oxide semiconductor layer; and wherein each of the first capacitor and the second capacitor has a capacitor electrode disposed in the second metal layer.

In the display panel provided by the present application, the first metal layer includes a first capacitor electrode, and the second metal layer includes a second capacitor electrode; or the second metal layer includes the first capacitor electrode, and the third metal layer includes the second capacitor electrode; and wherein the first capacitor electrode and the second capacitor electrode form the first capacitor, and the second capacitor electrode is electrically connected to the fourth metal layer.

In the display panel provided by the present application, the display panel further includes a first interlayer dielectric layer disposed between the second metal layer and the second semiconductor layer, a third insulating layer disposed between the second semiconductor layer and the third metal layer, and a second interlayer dielectric layer disposed between the third metal layer and the fourth metal layer.

In the display panel provided by the present application, the display panel is provided with a first via hole penetrating through the second interlayer dielectric layer, the third insulating layer, and the first interlayer dielectric layer; and wherein the fourth metal layer is electrically connected to the second capacitor electrode through the first via hole.

In the display panel provided by the present application, the display panel is provided with a first via hole penetrating through the second interlayer dielectric layer; and wherein the fourth metal layer is electrically connected to the second capacitor electrode through the first via hole.

In the display panel provided by the present application, the display panel further includes a second insulating layer disposed between the first semiconductor layer and the first metal layer, and a third insulating layer disposed between the first metal layer and the second metal layer; and wherein the first metal layer further includes a first gate and a third capacitor electrode, the second metal layer further includes a fourth capacitor electrode, and the third metal layer further includes a third gate, wherein the third capacitor electrode and the fourth capacitor electrode form the second capacitor.

In the display panel provided by the present application, the display panel further includes a third semiconductor layer spaced apart from and disposed in a same layer as the second semiconductor layer, and the third semiconductor layer is electrically connected to the fourth metal layer; and wherein a projection of the third semiconductor layer on the substrate at least partially overlaps a projection of an overlapping area between the first capacitor electrode and the second capacitor electrode on the substrate.

Beneficial effects of the present application: The present application proposes a circuit structure with seven transistors and two capacitors (7T2C), wherein a first semiconductor layer, a first metal layer, a second metal layer, a second semiconductor layer, a third metal layer, and a fourth metal layer are sequentially stacked on a substrate; the fourth metal layer includes a first source, a first drain, a second source, and a second drain; the first source and the first drain are electrically connected to the first semiconductor layer, the second source and the second drain are electrically connected to the second semiconductor layer, and the second semiconductor layer is an oxide semiconductor layer; wherein the first metal layer includes a first capacitor electrode, and the second metal layer includes a second capacitor electrode; or the second metal layer includes the first capacitor electrode, and the third metal layer includes the second capacitor electrode; and wherein the first capacitor electrode and the second capacitor electrode form the first capacitor, and the second capacitor electrode is electrically connected to the fourth metal layer. As a result, the display panel realizes low-frequency display and has a stable display effect; and meanwhile, the power consumption of the pixel driving circuits is reduced, and a problem of poor dark-state effect of the display panel under high-frequency display is prevented.

BRIEF DESCRIPTION OF DRAWINGS

The technical solutions and other beneficial effects of the present application will be made obvious by describing the specific implementation manners of the present application in detail below in conjunction with the accompanying drawings.

DETAILED DESCRIPTION OF PREFERRED EMBODIMENTS

The present application provides a display panel. In order to make the purpose, technical solution, and effect of the present application clearer and more definite, the present application is further described in detail below with reference to the accompanying drawings and examples. It should be appreciated that the specific embodiments described herein are only used to explain the present application, and are not used to limit the present application.

Figure 1:
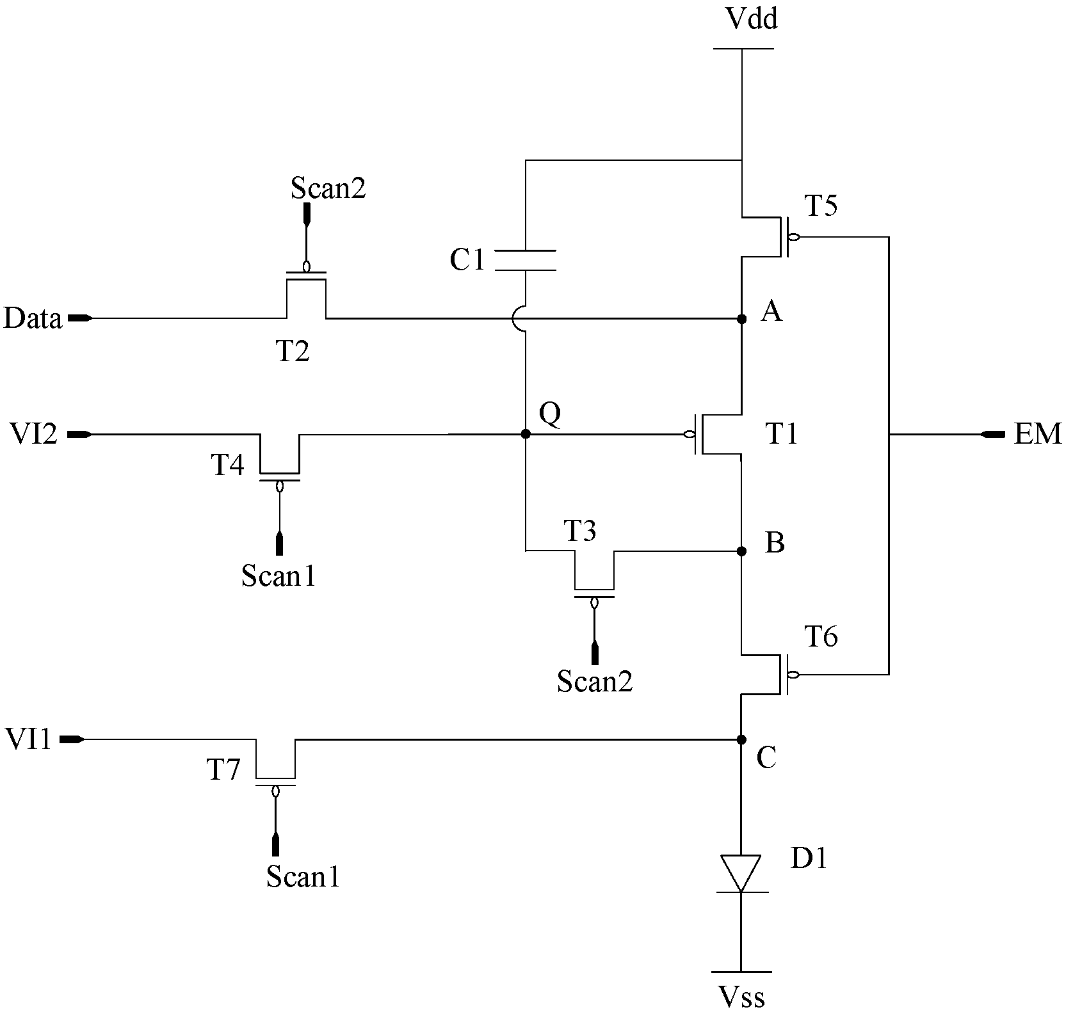
(Prior Art) FIG. 1
FIG. 1 is a schematic structural diagram of a pixel driving circuit of a display panel in the prior art.
Figure 2:
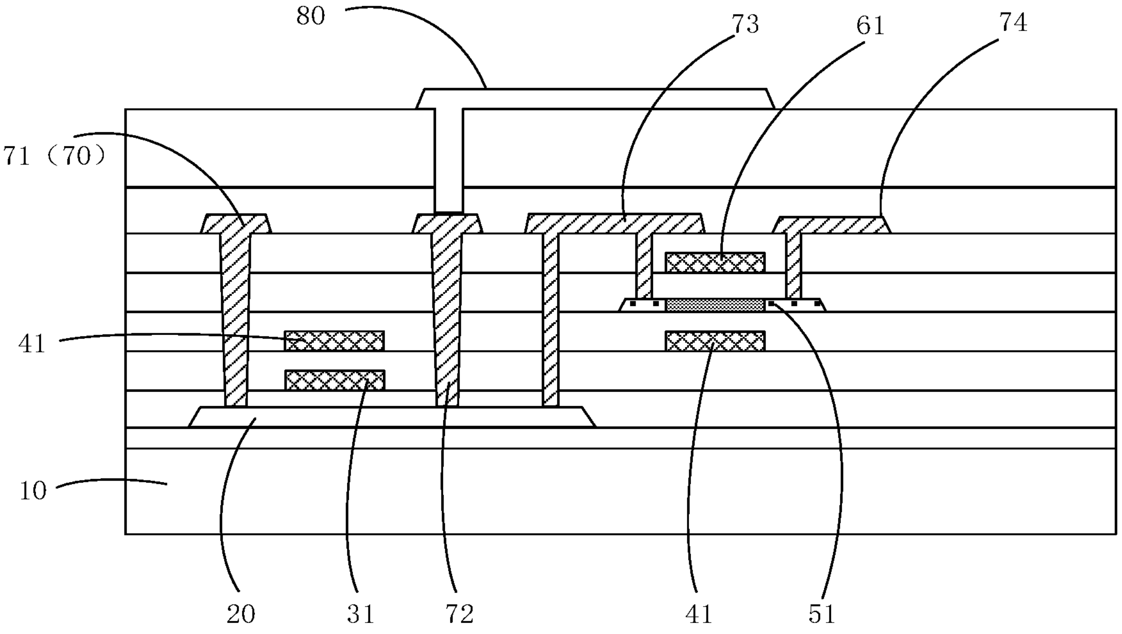
(Prior Art) FIG. 2
FIG. 2 is a schematic structural diagram of the display panel in the prior art.
Figure 3:
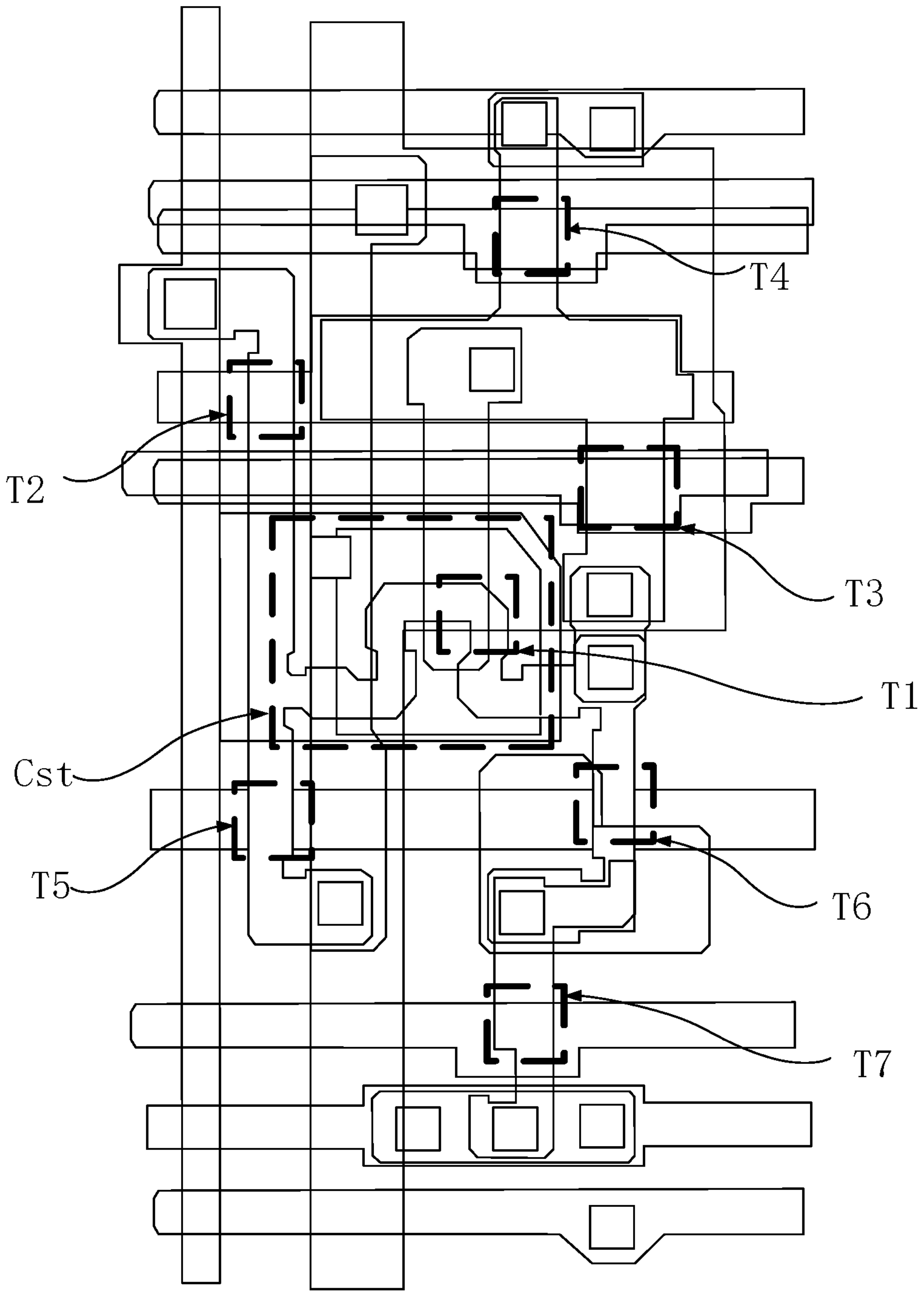
(Prior Art) FIG. 3
FIG. 3 is a schematic diagram of a superimposed plane structure of film layers of the display panel in the prior art.

Referring to FIGS. 1 to 3, in an existing circuit structure with seven transistors and one capacitor (7T1C), the display panel includes a substrate 10, a first semiconductor layer 20, a first metal layer 30, a second metal layer 40, a second semiconductor layer 51, a third metal layer 60, a fourth metal layer 70, and a fifth metal layer 80 sequentially stacked from bottom to top.

The first metal layer is patterned to form a first gate 31 and a third capacitor electrode (not shown), the second metal layer is patterned to form a fourth capacitor electrode 41, the third metal layer is patterned to form a third gate 61, and the fourth metal layer 70 is patterned to form a first source 71 and a first drain 72 that are electrically connected to the first semiconductor layer 20, and a second source 73 and a second drain 74 that are electrically connected to the second semiconductor layer 51.

The third capacitor electrode and the fourth capacitor electrode 41 form a storage capacitor Cst.

In the prior art, thin film transistors in a pixel circuit are usually formed by a low temperature poly-silicon (LTPS) process, and leakage current of the thin film transistors formed by the LTPS process is relatively large, so that problems such as flicker and high power consumption easily occur during low-frequency display, thereby impacting the display quality. In view of this, an embodiment of the present application provides a display panel to reduce power consumption of pixel driving circuits, thereby stabilizing the display effect of the display panel.

The technical solution of the present application will now be described in conjunction with specific embodiments.

Embodiment 1

Figure 6:
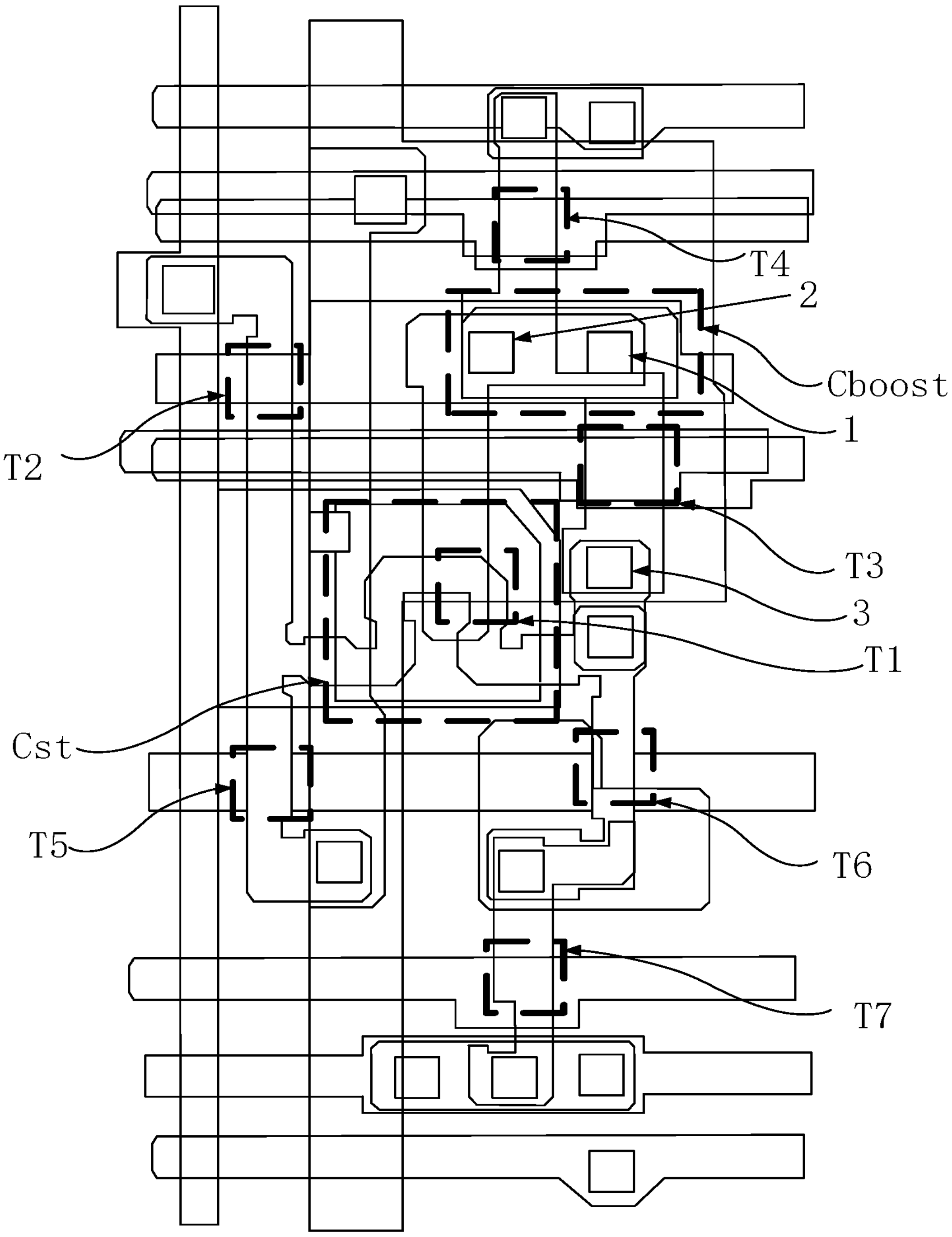
FIG. 6 is a schematic diagram of a superimposed plane structure of a first type of film layers of the display panel provided by an embodiment of the present application.
Figure 7:
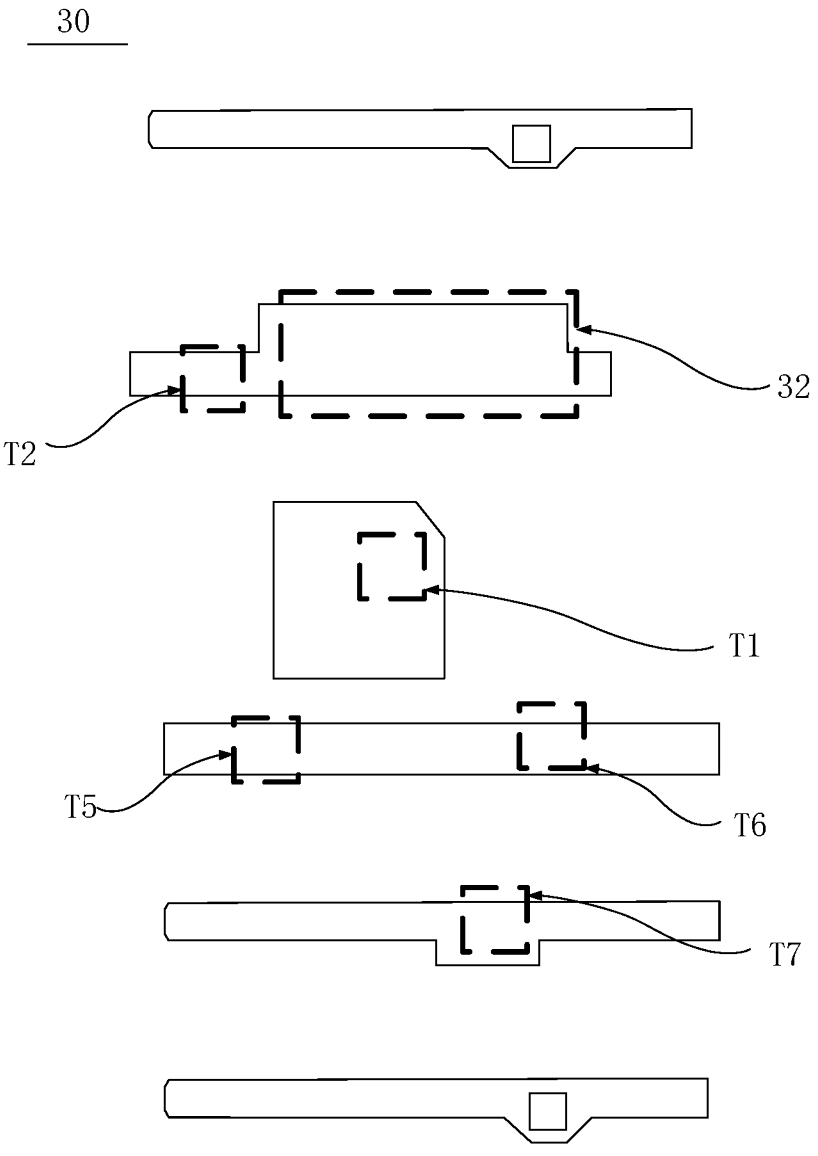
FIG. 7 is a schematic diagram of a first plane structure of a first metal layer of the display panel provided by an embodiment of the present application.
Figure 8:
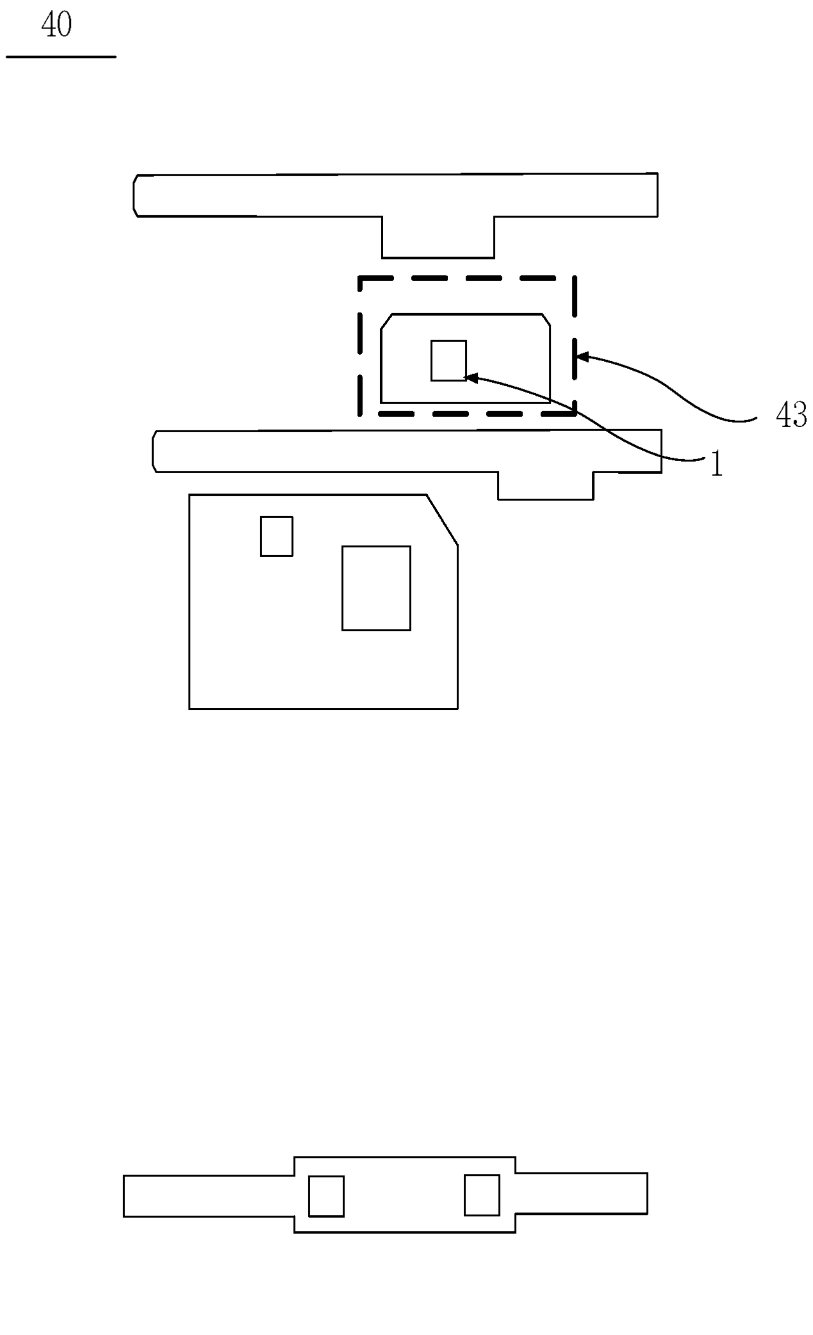
FIG. 8 is a schematic diagram of a first plane structure of a second metal layer of the display panel provided by an embodiment of the present application.
Figure 10:
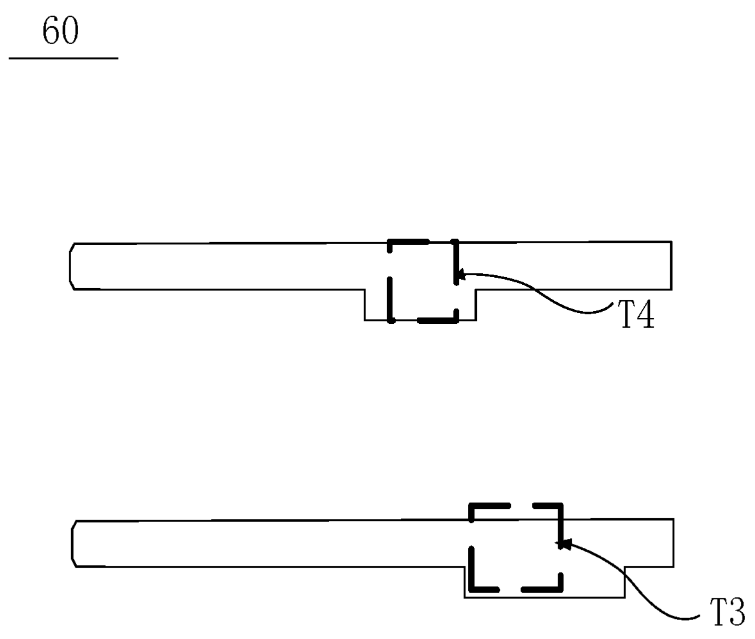
FIG. 10 is a schematic diagram of a first plane structure of a third metal layer of the display panel provided by an embodiment of the present application.
Figure 11:
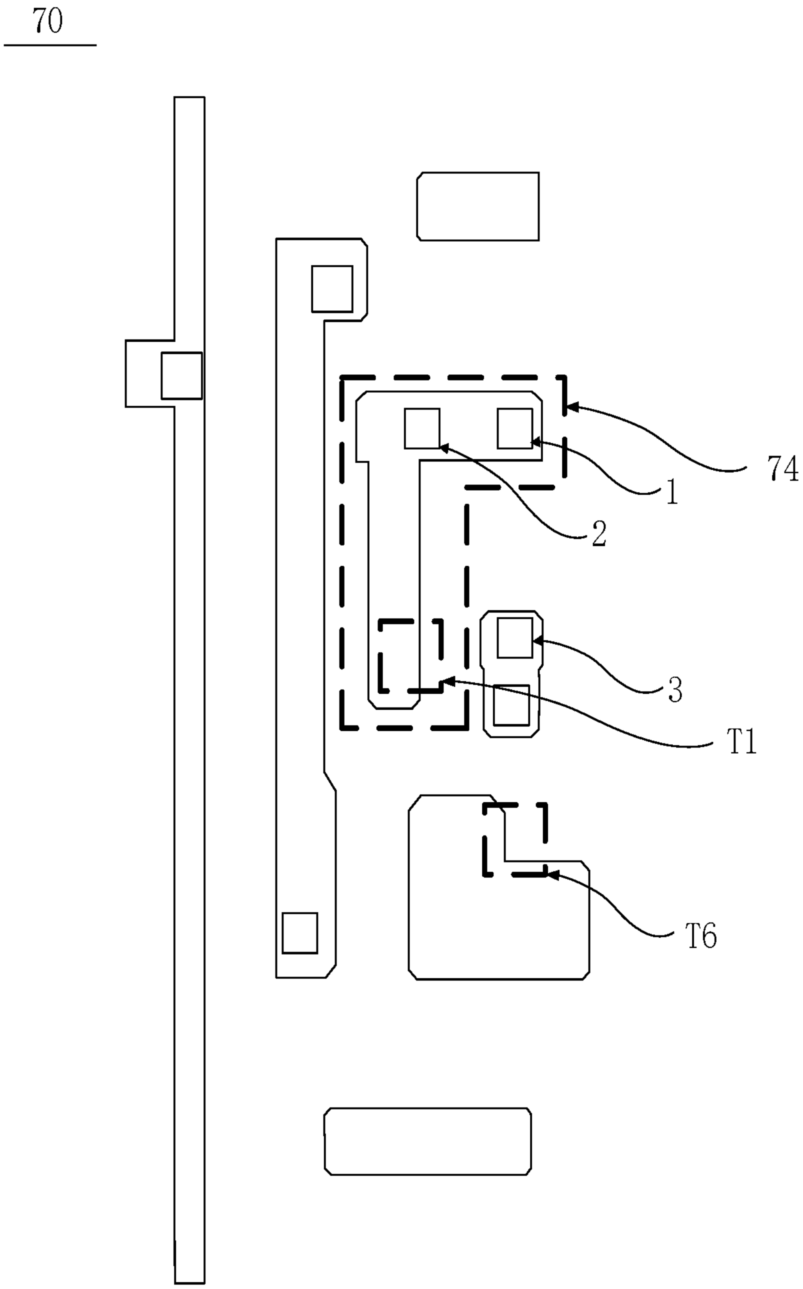
FIG. 11 is a schematic diagram of a first plane structure of a fourth metal layer of the display panel provided by an embodiment of the present application.
Figure 12:
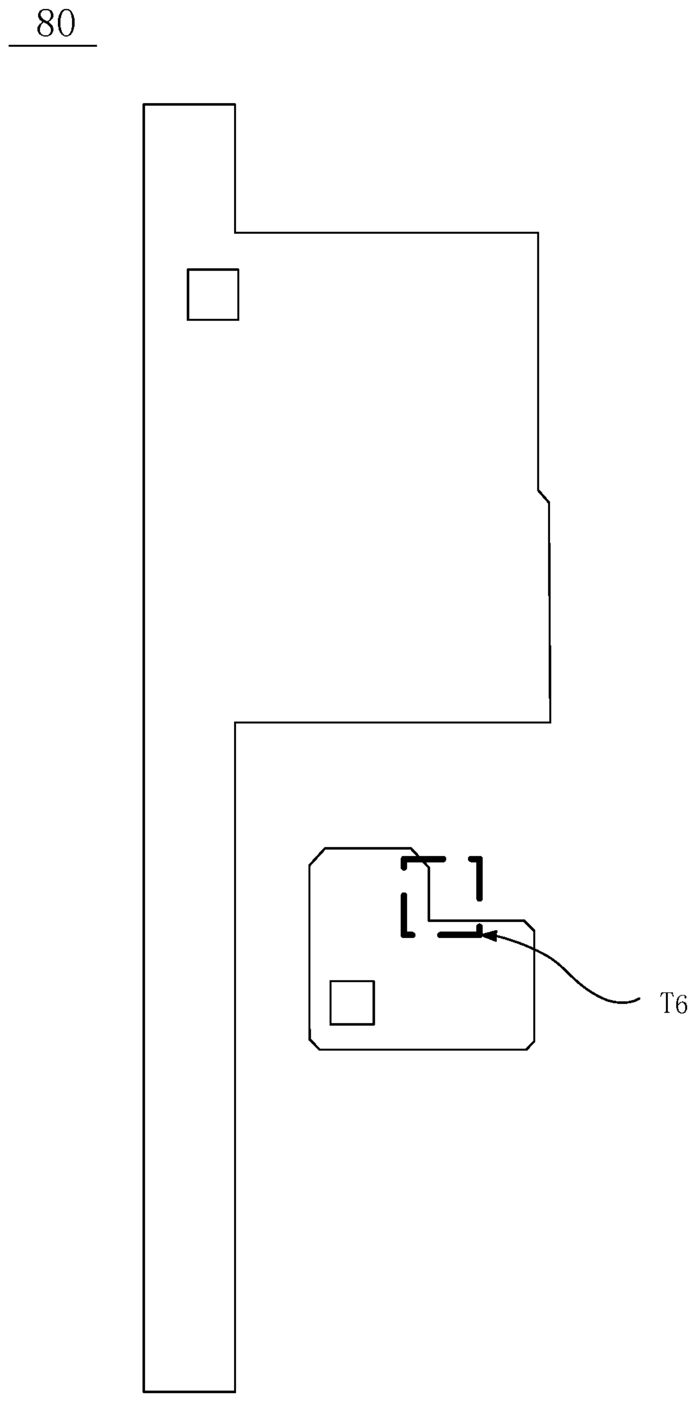
FIG. 12 is a schematic diagram of a first plane structure of a fifth metal layer of the display panel provided by an embodiment of the present application.

Referring to FIG. 4, FIG. 6, FIG. 8, and FIG. 10, FIG. 4 is a schematic diagram of a first structure of a display panel provided by an embodiment of the present application; FIG. 6 is a schematic diagram of a superimposed plane structure of a second type of film layers of the display panel provided by an embodiment of the present application; FIG. 8 is a schematic diagram of a first plane structure of a second metal layer of the display panel provided by an embodiment of the present application; and FIG. 10 is a schematic diagram of a first plane structure of a third metal layer of the display panel provided by an embodiment of the present application.

This embodiment provides a display panel, the display panel includes a substrate 10; and a pixel driving circuit layer (not shown) including a plurality of pixel driving circuits (not shown), and each of the pixel driving circuits includes a first capacitor Cboost and a second capacitor Cst.

The pixel driving circuit layer includes: a first semiconductor layer 20, a first metal layer 30, a second metal layer 40, a second semiconductor layer 51, a third metal layer 60, and a fourth metal layer 70 stacked on the substrate 10 in sequence, wherein the fourth metal layer 70 includes a first source 71, a first drain 72, a second source 73, and a second drain 74. The first source 71 and the first drain 72 are electrically connected to the first semiconductor layer 20, the second source 73 and the second drain 74 are electrically connected to the second semiconductor layer 51, and the second semiconductor layer 51 is an oxide semiconductor layer.

The first metal layer 30 includes a first capacitor electrode 32, and the second metal layer 40 includes a second capacitor electrode 42; or the second metal layer 40 includes a first capacitor electrode 32, and the third metal layer 60 includes a second capacitor electrode 42. The first capacitor electrode 32 and the second capacitor electrode 42 form a first capacitor Cboost, and the second capacitor electrode 42 is electrically connected to the fourth metal layer 70.

Further, in this embodiment, the first metal layer 30 includes a first capacitor electrode 32, the second metal layer 40 includes a second capacitor electrode 42, the first capacitor electrode 32 and the second capacitor electrode 42 form the first capacitor Cboost, and the second electrode layer 43 is electrically connected to the second drain 74.

It is appreciated that the electrical connection between the second electrode layer 43 and the second drain 74 is only for illustration, and this embodiment does not particularly limit thereto.

Referring to FIGS. 4, 6, 7, and 8, in this embodiment, the first metal layer further includes a first gate 31 and a third capacitor electrode (not shown), the second metal layer 40 further includes a fourth capacitor electrode 41, and the third metal layer further includes a third gate 61, wherein the third capacitor electrode and the fourth capacitor electrode 41 form the second capacitor Cst.

It should be noted that, in this embodiment, the first gate 31 and the third capacitor electrode may be formed of a same metal block, and they are located in different regions of the same metal block.

The display panel further includes a first interlayer dielectric layer 110 located between the second metal layer 40 and the second semiconductor layer 51, a third insulating layer 120 located between the second semiconductor layer 51 and the third metal layer 60, and a second interlayer dielectric layer 130 located between the third metal layer 60 and the fourth metal layer 70.

Specifically, the display panel includes the substrate 10, the first semiconductor layer 20, a first insulating layer 90, a first gate 31, a second insulating layer 100, a fourth capacitor electrode 41, a first interlayer dielectric layer 110, the second semiconductor layer 51, the third insulating layer 120, a third gate 61, a second interlayer dielectric layer 130, the fourth metal layer 70, a passivation layer 140, a first planarization layer 150, and the fifth metal layer 80 stacked from bottom to top.

It should be noted that in this embodiment, the substrate 10 may include a rigid substrate or a flexible substrate. When the substrate 10 is a rigid substrate, the material may be metal or glass. When the substrate 10 is a flexible substrate, the material may include at least one of acrylic resin, methacrylic resin, polyisoprene, vinyl resin, epoxy resin, polyurethane-based resin, cellulose resin, siloxane resin, polyimide-based resin, or polyamide-based resins. The material of the substrate 10 is not particularly limited in the present application.

Further, the substrate 10 is a flexible substrate, including a first flexible substrate, a barrier layer, a second flexible substrate, and a buffer layer that are stacked, wherein the materials of the first flexible substrate and the second flexible substrate can include at least one of polyimide, polyethylene terephthalate, polyethylene naphthalate, polycarbonate, polyarylate, or polyethersulfone. The material of the barrier layer is usually silicon oxide (SiOx). The buffer layer may include an inorganic material, such as at least one of silicon nitride or silicon oxide, to prevent foreign impurities under the substrate 10 from penetrating into the overlying transistors, and to improve the bond strength between the substrate 10 and the overlying layers.

In this embodiment, a material of the first semiconductor layer 20 includes but is not particularly limited to polysilicon, and a material of the second semiconductor layer 51 includes but is not particularly limited to oxide. The first semiconductor layer forms a polysilicon active layer of each low temperature polysilicon transistor, and the second semiconductor layer 51 forms an oxide active layer of each oxide transistor, and the first semiconductor layer 20 and the second semiconductor layer 51 are electrically connected to each other through the second source 73.

In this embodiment, materials of the first metal layer 30, the second metal layer 40, and the third metal layer 60 may include at least one metal of molybdenum (Mo), aluminum (Al), platinum (Pt), and palladium. (Pd), silver (Ag), magnesium (Mg), gold (Au), nickel (Ni), neodymium (Nd), iridium (Ir), chromium (Cr), calcium (Ca), titanium (Ti), tantalum (Ta), or tungsten (W).

A first gate 31 and the first capacitor electrode 32 are located in a same layer and can be fabricated in a same process. The fourth capacitor electrode 41 and the second capacitor electrode 42 are located in a same layer, and also can be fabricated in a same process. As such, the impact on a thickness of the display panel can be minimized.

In this embodiment, materials of the first insulating layer 90, the second insulating layer 100, and the third insulating layer 120 include but are not particularly limited to silicon oxide; and materials of the first interlayer dielectric layer 110 and the second interlayer dielectric layer 130 include at least one of silicon nitride or silicon oxide.

In addition, the display panel may further include a first planarization layer 150, a second planarization layer 170, an anode 190, a pixel definition layer 180, a light-emitting function layer 200, and a supporting spacer 210 located above the fifth metal layer 80.

Referring to FIGS. 4, 6, 8, and 10, in this embodiment, the display panel is provided with a second interlayer dielectric layer 130, a third insulating layer 120, and a first interlayer dielectric layer 110 penetrating a first via hole 1, wherein the fourth metal layer 70 is electrically connected to the second capacitor electrode 42 through the first via hole 1.

Further, in this embodiment, the second source electrode 73 or the second drain electrode 74 is electrically connected to the second electrode layer 43 through the first via hole 1. It is appreciated that this embodiment does not make further restrictions on this.

Figure 4:
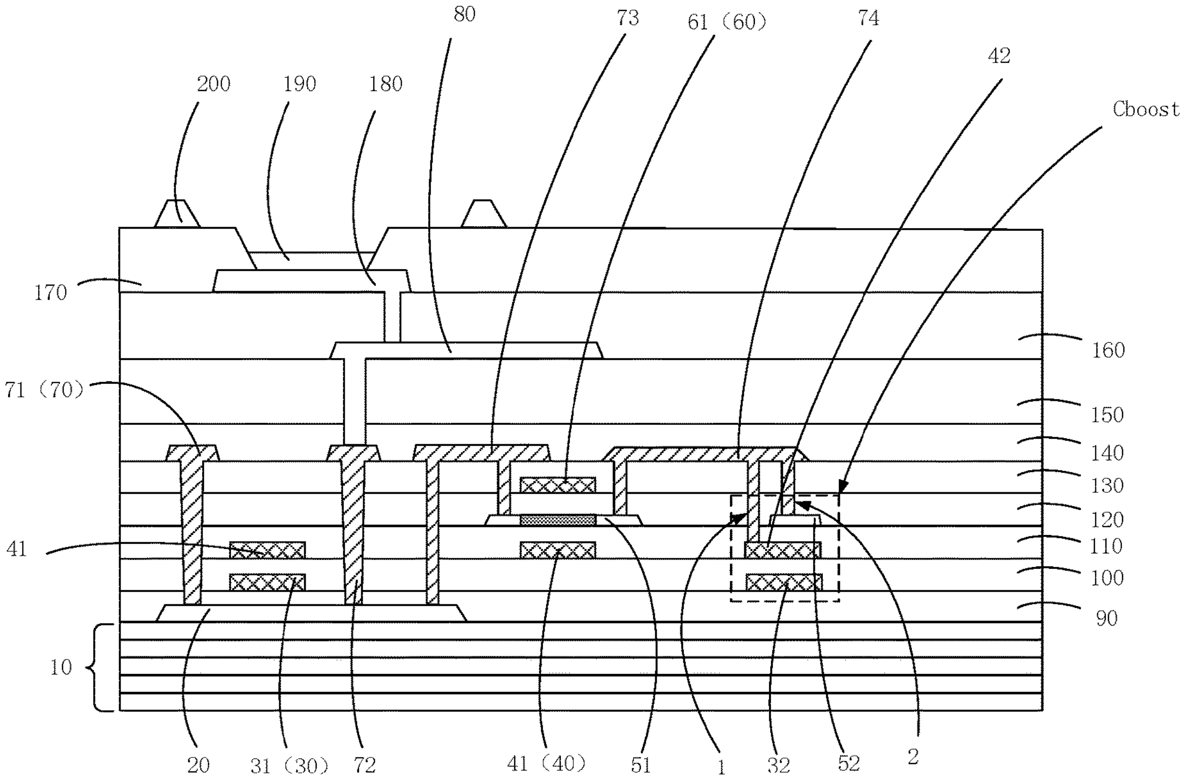
FIG. 4 is a schematic diagram of a first structure of a display panel provided by an embodiment of the present application.
Figure 9:
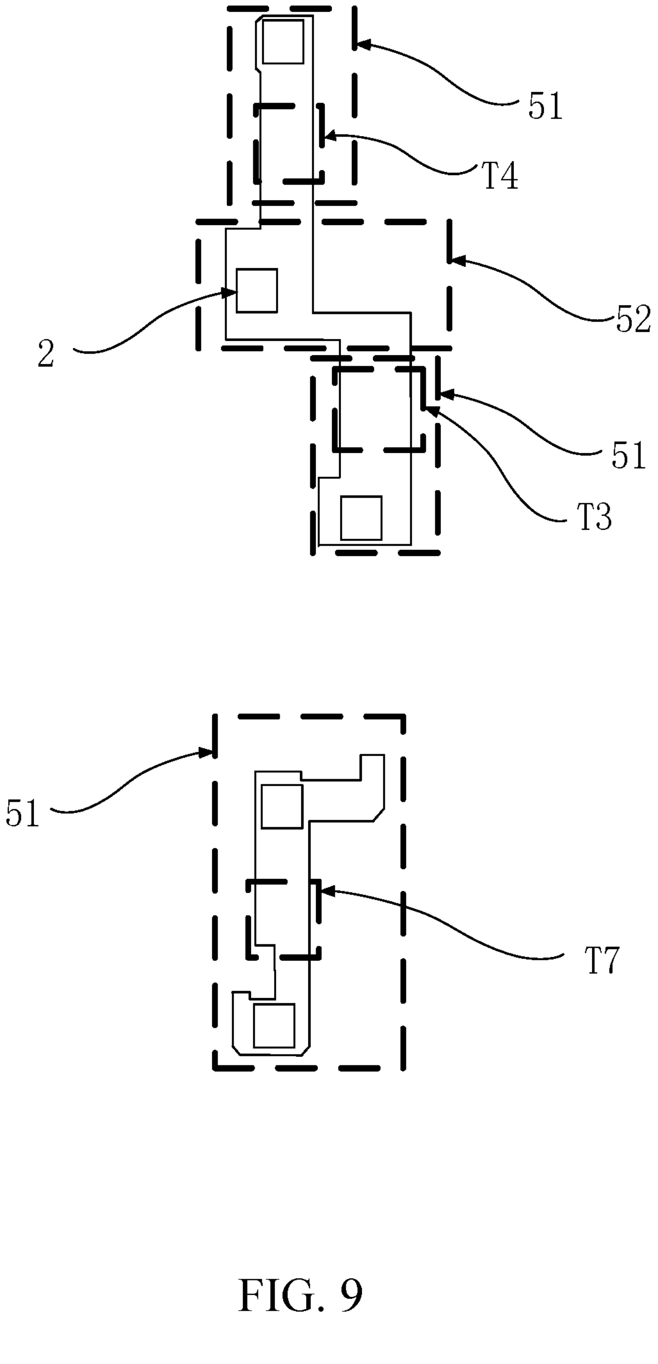
FIG. 9 is a schematic diagram of a first plane structure of a second semiconductor layer and a third semiconductor layer of the display panel provided by an embodiment of the present application.

Referring to FIGS. 4, 6, and 9, the display panel further includes a third semiconductor layer 52 in the same layer as and spaced apart from the second semiconductor layer 51, and the third semiconductor layer 52 and the fourth metal layer 70 are electrically connected to each other, wherein a projection of the third semiconductor layer 52 on the substrate 10 at least partially overlaps a projection of an overlapping area between the first capacitor electrode 32 and the second capacitor electrode 42 on the substrate 10.

Specifically, the third semiconductor layer 52 is electrically connected to the second semiconductor layer 51 through the second source 73 or the second drain 74. It is appreciated that this embodiment does not make further restrictions on this.

In this embodiment, a material of the third semiconductor layer 52 includes oxide, and the third semiconductor layer 52 and the second semiconductor layer 51 are formed of a same oxide.

Further, referring to FIGS. 4, 6, 9, and 10, in this embodiment, the display panel is provided with a second via hole penetrating the second interlayer dielectric layer 130 and the third insulating layer 120, wherein the fourth metal layer 70 is electrically connected to the third semiconductor layer 52 through the second via hole 2.

Further, in this embodiment, the second source 73 or the second drain 74 is electrically connected to the third semiconductor layer 52 through the second via hole 2. It can be appreciated that this embodiment does not make further restrictions on this.

In this embodiment, the third semiconductor layer 52 is prepared on the second electrode layer 43, so that the second electrode layer 43 constituting the first capacitor Cboost has a three-dimensional structure, resulting in an increase on a surface area of the capacitor structure in a given chip area, thereby increasing a capacitance value of the first capacitor Cboost, that is, providing a capacitor structure of a small size and large capacity.

Figure 5:
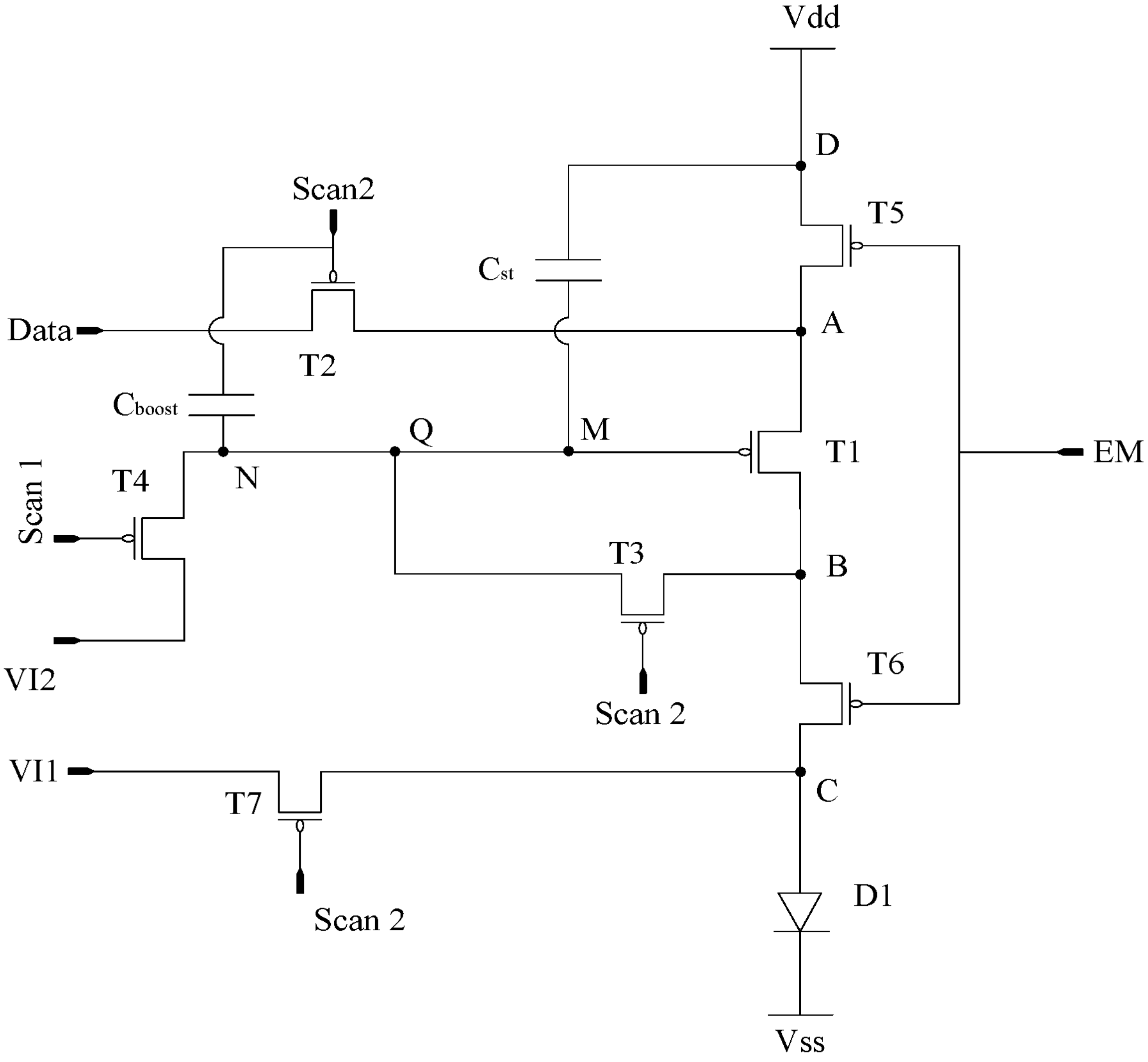
FIG. 5 is a schematic structural diagram of a pixel driving circuit of the display panel provided by an embodiment of the present application.

Referring to FIGS. 5 and 6, in this embodiment, the display panel further includes a plurality of light-emitting devices D1 arranged in an array and a plurality of pixel driving circuits that drive the light-emitting devices D1 to emit light, and each of the pixel driving circuits includes:

- a first initialization transistor T4, a switching transistor T2, a driving transistor T1, a compensation transistor T3, a second initialization transistor T7, a first light-emitting control transistor T5, a second light-emitting control transistor T6, the first capacitor Cboost, and the second capacitor Cst.

A gate of the driving transistor T1 is connected to a first node Q(N)(M), a first terminal of the driving transistor T1 is connected to a third node B, and a second terminal of the driving transistor T1 is connected to a second node A.

A gate of the switching transistor T2 is connected to a second scan signal Scan2, a first terminal of the switching transistor T2 is connected to a data signal Data, and a second terminal of the switching transistor T2 is connected to the second node A.

A gate of the compensation transistor T3 is connected to the second scan signal Scan2, a first terminal of the compensation transistor T3 is connected to the third node B, and a second terminal of the compensation transistor T3 is connected to the first node Q(N)(M).

A gate of the first initialization transistor T4 is connected to a first scan signal Scant, a first terminal of the first initialization transistor T4 is connected to a second initialization signal VI2, and a second terminal of the first initialization transistor T4 is connected to the first node Q(N)(M).

A gate of the first light-emitting control transistor T5 is connected to a light-emitting control signal EM, a first terminal of the first light-emitting control transistor T5 is connected to a fifth node D, a second terminal of the first light-emitting control transistor T5 is connected to the second node A, and the first light-emitting control transistor T5 is connected to a power high-potential signal line Vdd through the fifth node D.

A gate of the second light-emitting control transistor T6 is connected to the light-emitting control signal EM, a first terminal of the second light-emitting control transistor T6 is connected to the third node B, and a second terminal of the second light-emitting control transistor T6 is connected to the fourth node C.

A gate of the second initialization transistor T7 is connected to the second scan signal Scan2, a first terminal of the second initialization transistor T7 is connected to the fourth node C, and a second terminal of the second initialization transistor T7 is connected to the first initialization signal VI.

The first capacitor electrode 32 of the first capacitor Cboost is connected to the gate of the switching transistor T2, and the second capacitor electrode 42 of the first capacitor Cboost is connected to the first node Q(N)(M).

The third capacitor electrode of the second capacitor Cst is connected to the fifth node D, the fourth capacitor electrode 41 of the second capacitor Cst is connected to the first node Q(N)(M), and the second capacitor Cst is connected to the power high-potential signal line Vdd through the fifth node D.

Further, in this embodiment, the compensation transistor T3, the first initialization transistor T4, and the second initialization transistor T7 are oxide transistors; and the switching transistor T2, the driving transistor T1, the first light-emitting control transistor T5, and the second light-emitting control transistor T6 are low temperature polysilicon transistors.

Referring to FIGS. 4, 6, 7, 8, 9, 10, and 11, in this embodiment, the compensation transistor T3 includes the fourth capacitor electrode 41, the first interlayer dielectric layer 110, the second semiconductor layer 51, the third insulating layer 120, the third gate 61, the second interlayer dielectric layer 130, and the fourth metal layer 70 stacked on the substrate 10; the display panel is also provided with a third via hole 3 penetrating through the second interlayer dielectric layer 130 and the third insulating layer 120; and the fourth metal layer 70 is electrically connected to the second semiconductor layer 51 through the third via hole 3; wherein a distance from the first via hole 1 to the second semiconductor layer 51 of the compensation transistor T3 is the same as a distance from the third via hole 3 to the second semiconductor layer 51 of the compensation transistor T3, so that electrical performance of the compensation transistor T3 can be significantly improved, and when the compensation transistor T3 is turned on, it can work more stably.

In this embodiment, a first semiconductor layer 20, a first metal layer 30, a second metal layer 40, a second semiconductor layer 51, a third metal layer 60, and a fourth metal layer 70 are sequentially stacked on a substrate 10, wherein the fourth metal layer 70 includes a first source 71, a first drain 72, a second source 73, and a second drain 74; the first source 71 and the first drain 72 are electrically connected to the first semiconductor layer 20, the second source 73 and the second drain 74 are electrically connected to the second semiconductor layer 51, and the second semiconductor layer 51 is an oxide semiconductor layer; wherein the first metal layer includes a first capacitor electrode 32, and the second metal layer 40 includes a second capacitor electrode 42; and wherein the first capacitor electrode 32 and the second capacitor electrode 42 form the first capacitor Cboost, and the second capacitor electrode 42 is electrically connected to the fourth metal layer 70. As a result, the display panel realizes low-frequency display and has a stable display effect; and meanwhile, the power consumption of the pixel driving circuits is reduced, and a problem of poor dark-state effect of the display panel under high-frequency display is prevented.

Figure 13:
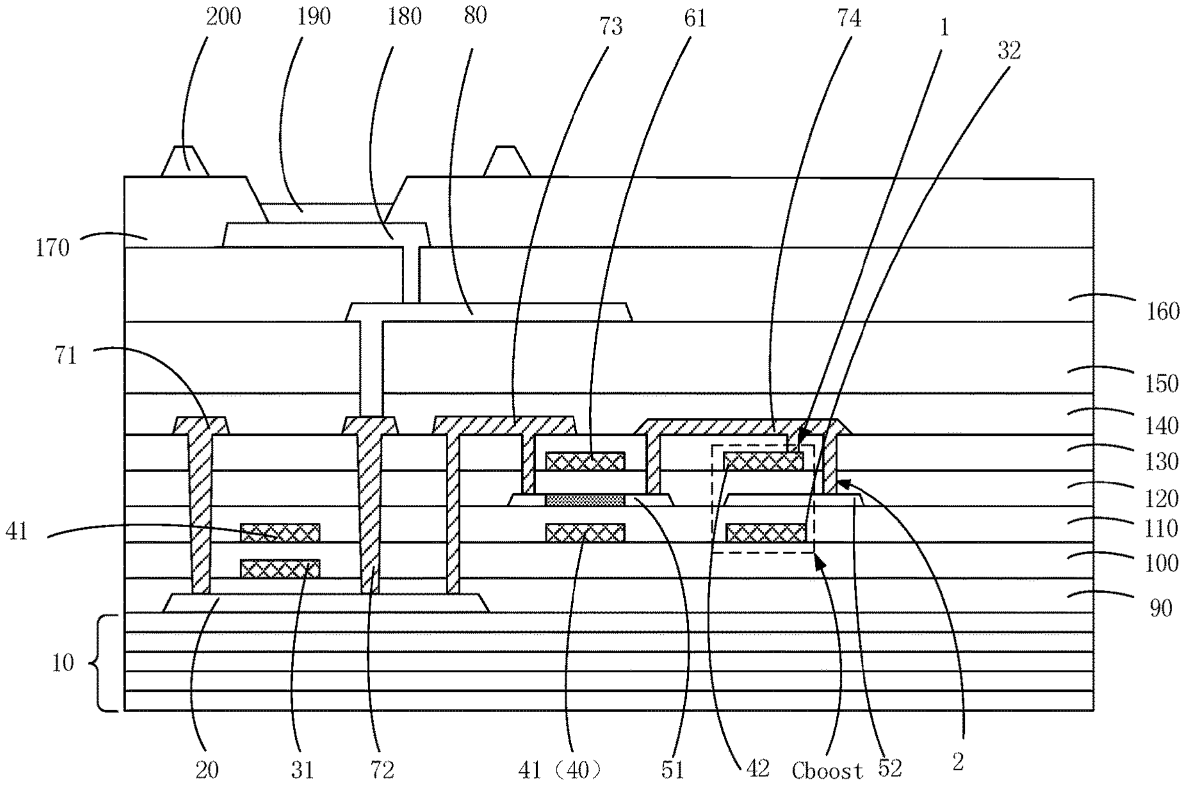
FIG. 13 is a schematic diagram of a second structure of a display panel provided by an embodiment of the present application.

Referring to FIG. 13, FIG. 13 is a schematic diagram of the second structure of a display panel provided by an embodiment of the present application.

In this embodiment, the second structural diagram of the display panel is similar/substantially the same as the schematic diagram of the first structure of the display panel provided in Embodiment 1 above, and details can be referred to the description of the first structure diagram of the display panel in above-mentioned Embodiment 1, and will not be repeated herein for brevity. The difference therebetween is only in that as follows:

In this embodiment, the second metal layer 40 includes a first capacitor electrode 32, and the third metal layer 60 includes a second capacitor electrode 42; the first capacitor electrode 32 and the second capacitor electrode 42 form the first capacitor Cboost; and the second capacitor electrode 42 is electrically connected to the fourth metal layer 70.

Furthermore, the second electrode layer 43 is electrically connected to the second drain 74.

In this embodiment, the first metal layer 30 further includes a first gate 31, the second metal layer 40 further includes a fourth capacitor electrode 41, and the third metal layer 60 further includes a third gate 61.

In this embodiment, the display panel is provided with a first capacitor electrode 32 and a second electrode layer 43 that are disposed opposite to each other, wherein the first capacitor electrode 32 and the fourth capacitor electrode 41 are arranged in the same layer, the second electrode layer 43 is arranged in the same layer as the third gate 61, and the first capacitor electrode 32 and the second electrode layer 43 form the first capacitor Cboost, so that the display panel realizes low-frequency display and has a stable display effect.

Figure 14:
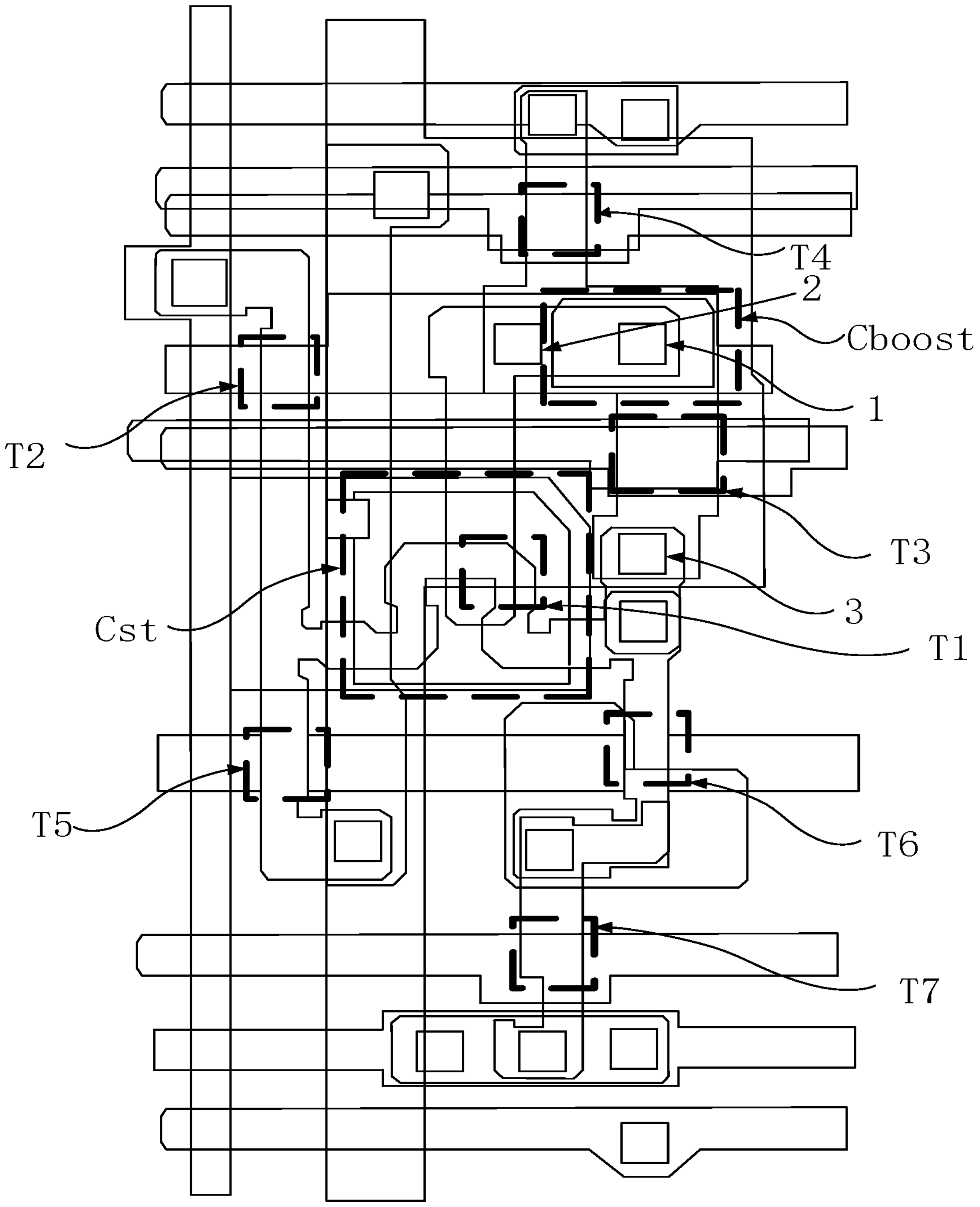
FIG. 14 is a schematic diagram of a superimposed plane structure of a second type of film layers of the display panel provided by an embodiment of the present application.
Figure 15:
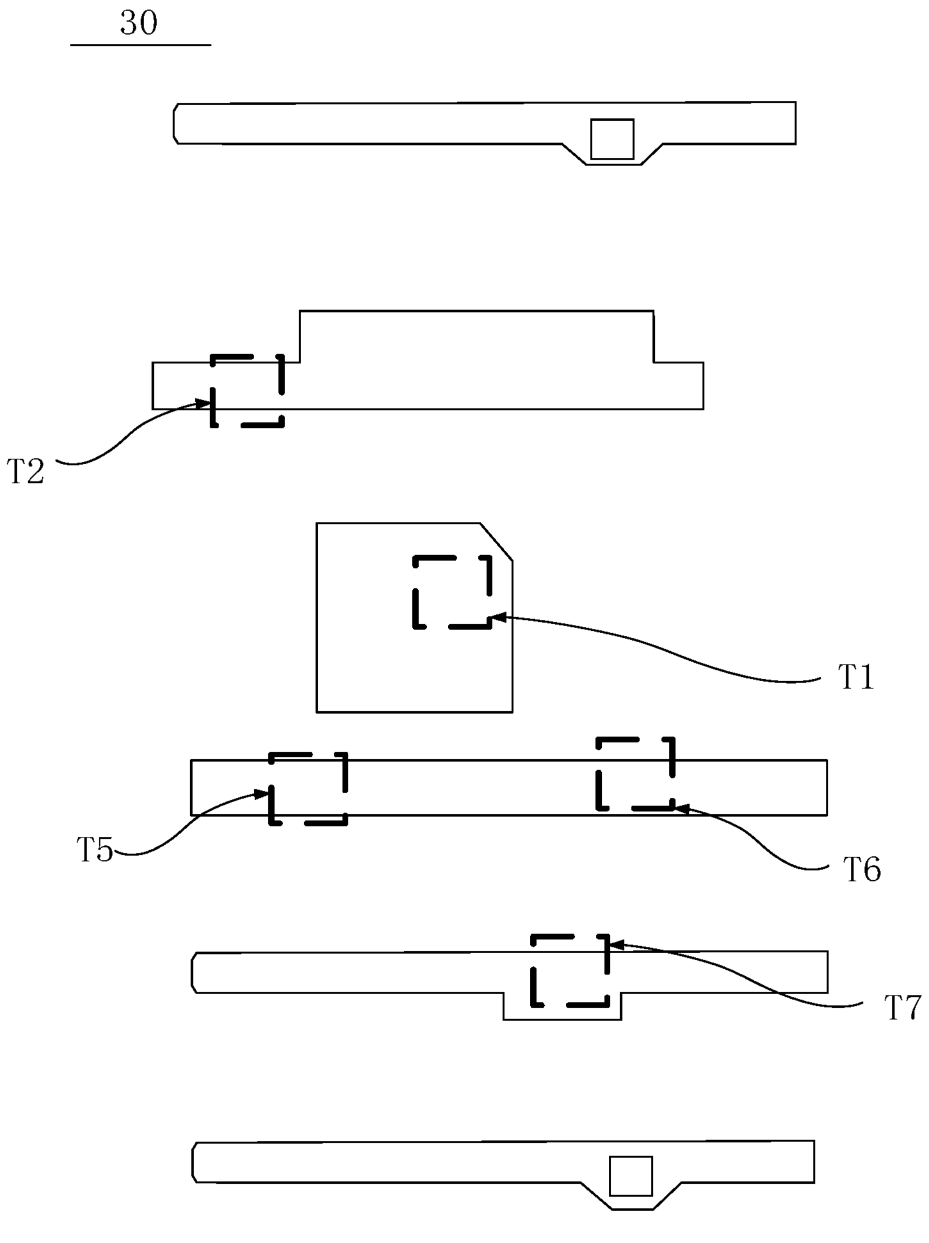
FIG. 15 is a schematic diagram of a second plane structure of a first metal layer of the display panel provided by an embodiment of the present application.
Figure 16:
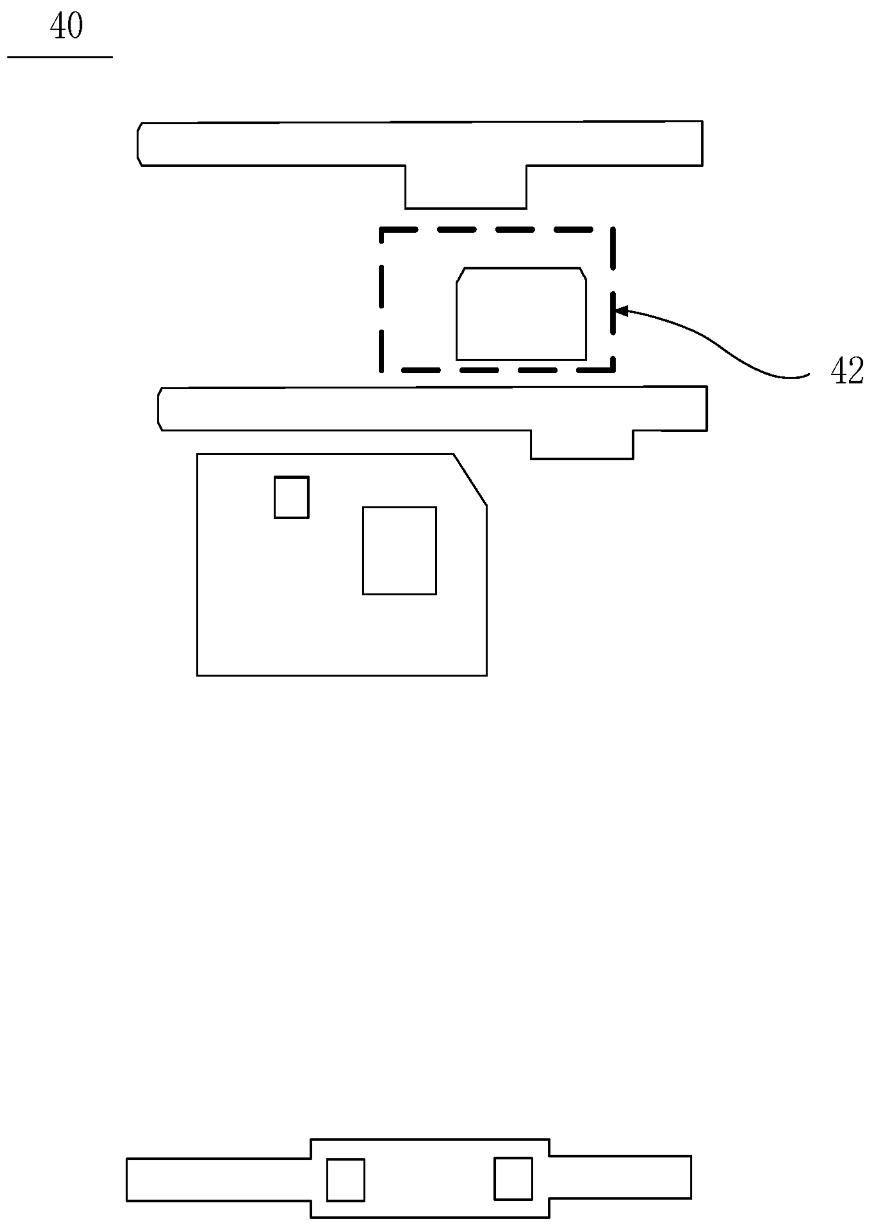
FIG. 16 is a schematic diagram of a second plane structure of a second metal layer of the display panel provided by an embodiment of the present application.
Figure 18:
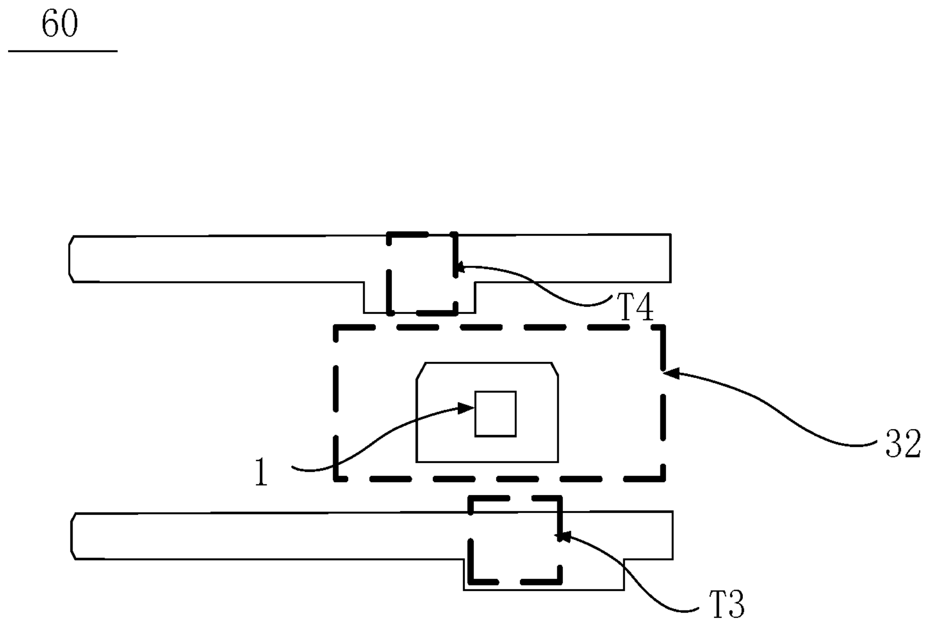
FIG. 18 is a schematic diagram of a second plane structure of a third metal layer of the display panel provided by an embodiment of the present application.

Referring to FIGS. 13, 14, and 18, in this embodiment, the display panel is provided with a first via hole 1 penetrating through the second interlayer dielectric layer 130, wherein the fourth metal layer 70 is electrically connected to the second capacitor electrode 42 through the first via hole 1.

Further, in this embodiment, the second source electrode 73 or the second drain electrode 74 passes through the first via hole 1 and is electrically connected to the second electrode layer 43. It can be appreciated that this embodiment does not make further restrictions on this.

Figure 17:
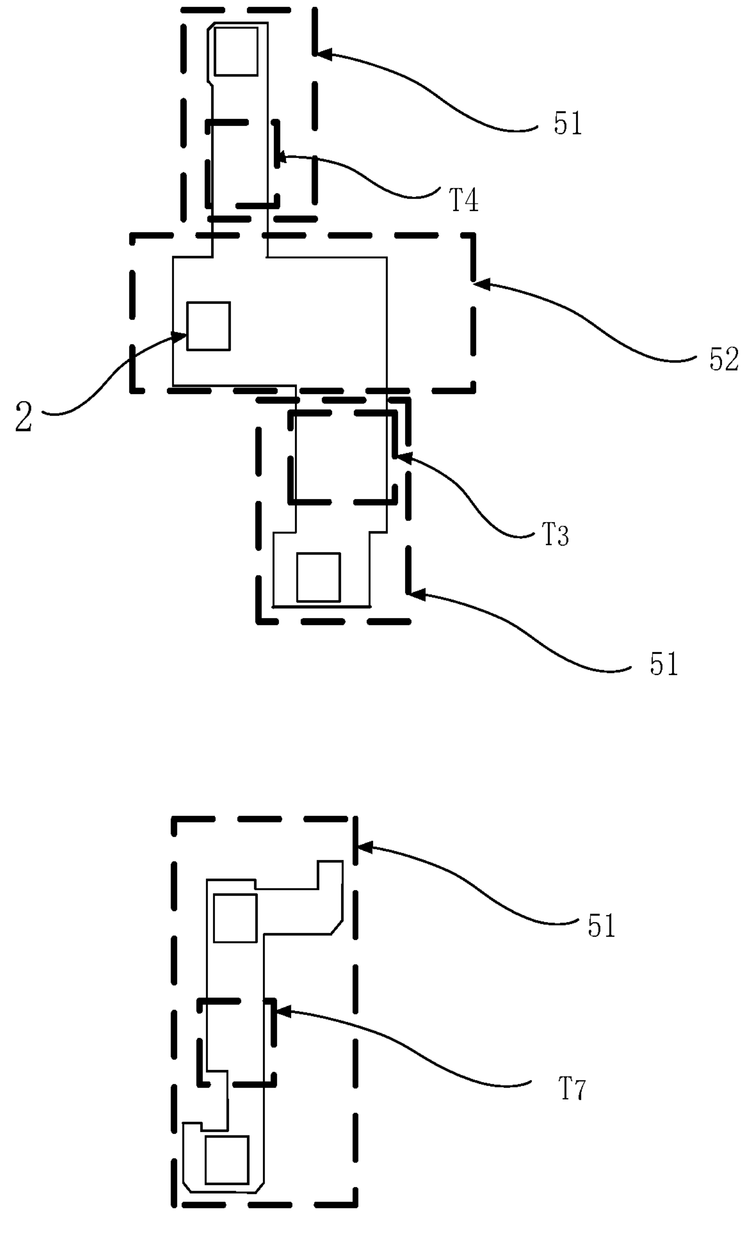
FIG. 17 is a schematic diagram of a second plane structure of a second semiconductor layer and a third semiconductor layer of the display panel provided by an embodiment of the present application.

Referring to FIGS. 13, 14, and 17, in this embodiment, the third semiconductor layer 52 is formed on the second electrode layer 43, so that the first capacitor electrode 32 constituting the first capacitor Cboost has a three-dimensional structure, resulting in an increase on a surface area of the capacitor structure when an area of a chip is constant, thereby increasing a capacitance value of the first capacitor Cboost, that is, providing a capacitor structure of a small size and large capacity.

Further, referring to FIGS. 13, 14, and 17, in this embodiment, the display panel is provided with a second via hole 2 penetrating through the second interlayer dielectric layer 130, wherein the fourth metal layer 70 is electrically connected to the third semiconductor layer 52 through the second via hole 2.

Further, in this embodiment, the second source 73 or the second drain 74 is electrically connected to the third semiconductor layer 52 through the second via hole 2. It can be appreciated that this embodiment does not make further restrictions on this.

Embodiment 2

Referring to FIGS. 4 and 5, an embodiment of the present application provides a display panel. The display panel includes a plurality of light-emitting devices arranged in an array and a plurality of pixel driving circuits that drive the light-emitting device D1 to emit light. The pixel driving circuit includes:

the first initialization transistor T4 used for inputting the second initialization signal VI2 to the first node Q(N)(M) under control of the first scan signal Scan1.

The switching transistor T2 is used to input the data signal Data to the second node A under control of the second scan signal Scan2.

The driving transistor T1 is configured to drive the light-emitting device D1 to emit light under control of the potentials of the first node Q(N)(M) and the second node A.

The compensation transistor T3 is connected to the driving transistor T1 through the first node Q(N)(M) and the third node B, and is configured to compensate a threshold voltage of the driving transistor T1 under control of the third scan signal Scan2.

The second initialization transistor T7 is configured to input the first initialization signal VI1 to an anode of the light-emitting device D1 under the control of the second scan signal Scan2.

The first light-emitting control transistor T5 is connected to the driving transistor T1 through the second node A, and is configured to turn on a current flowing from the power high-potential signal line to the driving transistor T1 under control of the light-emitting control signal EM.

The second light-emitting control transistor T6 is connected to the driving transistor T1 through the third node B, and is configured to turn on a current flowing from the driving transistor T1 to the anode of the light-emitting device D1 under control of the light-emitting control signal EM.

The first capacitor Cboost is coupled between the first node Q(N)(M) and the gate of the switching transistor T2, and is configured to reduce a potential of the first node Q(N)(M).

The second capacitor Cst is connected to the driving transistor T1 through the first node Q(N)(M), is connected to the power high-potential signal line Vdd through the fourth node C, and is configured to store data signals.

The first capacitor Cboost includes a first capacitor electrode 32 and a second capacitor electrode 42 arranged opposite to each other, the first capacitor electrode 32 is electrically connected to a gate of the switching transistor T2, and the second capacitor electrode 42 is electrically connected to the first initialization transistor T4 through a first node Q(N)(M), wherein the switching transistor T2 is a low-temperature polysilicon transistor, and the first initialization transistor T4 is an oxide transistor.

In this embodiment, a gate of the driving transistor T1 is connected to the first node Q(N)(M), a first terminal of the driving transistor T1 is connected to the third node B, and a second terminal of the driving transistor T1 is connected to the second node A.

A gate of the switching transistor T2 is connected to a second scan signal Scan2, a first terminal of the switching transistor T2 is connected to a data signal Data, and a second terminal of the switching transistor T2 is connected to the second node A.

A gate of the compensation transistor T3 is connected to the second scan signal Scan2, a first terminal of the compensation transistor T3 is connected to the third node B, and a second terminal of the compensation transistor T3 is connected to the first node Q(N)(M).

A gate of the first initialization transistor T4 is connected to a first scan signal Scant, a first terminal of the first initialization transistor T4 is connected to a second initialization signal VI2, and a second terminal of the first initialization transistor T4 is connected to the first node Q(N)(M).

A gate of the first light-emitting control transistor T5 is connected to a light-emitting control signal EM, a first terminal of the first light-emitting control transistor T5 is connected to a fifth node D, a second terminal of the first light-emitting control transistor T5 is connected to the second node A, and the first light-emitting control transistor T5 is connected to a power high-potential signal line Vdd through the fifth node D.

A gate of the second light-emitting control transistor T6 is connected to the light-emitting control signal EM, a first terminal of the second light-emitting control transistor T6 is connected to the third node B, and a second terminal of the second light-emitting control transistor T6 is connected to the fourth node C.

A gate of the second initialization transistor T7 is connected to the second scan signal Scan2, a first terminal of the second initialization transistor T7 is connected to the fourth node C, and a second terminal of the second initialization transistor T7 is connected to the first initialization signal VI.

The first capacitor electrode 32 of the first capacitor Cboost is connected to the gate of the switching transistor T2, and the second capacitor electrode 42 of the first capacitor Cboost is connected to the first node Q(N)(M).

The third capacitor electrode of the second capacitor Cst is connected to the fifth node D, the fourth capacitor electrode 41 of the second capacitor Cst is connected to the first node Q(N)(M), and the second capacitor Cst is connected to the power high-potential signal line Vdd through the fifth node D.

Further, in this embodiment, the compensation transistor T3, the first initialization transistor T4, and the second initialization transistor T7 are oxide transistors; and the switching transistor T2, the driving transistor T1, the first light-emitting control transistor T5, and the second light-emitting control transistor T6 are low temperature polysilicon transistors.

Further, this embodiment provides a display panel as described in any of the foregoing embodiments, which has the same technical effects as the foregoing display panel, and will not be repeated herein for brevity.

In summary, the present application provides a display panel. The display panel includes a substrate; and a first semiconductor layer, a first metal layer, a second metal layer, a second semiconductor layer, a third metal layer, and a fourth metal layer sequentially stacked on the substrate, wherein the fourth metal layer includes a first source, a first drain, a second source, and a second drain; the first source and the first drain are electrically connected to the first semiconductor layer, the second source and the second drain are electrically connected to the second semiconductor layer, and the second semiconductor layer is an oxide semiconductor layer; wherein the first metal layer includes a first capacitor electrode, and the second metal layer includes a second capacitor electrode; and wherein the first capacitor electrode and the second capacitor electrode form the first capacitor, and the second capacitor electrode is electrically connected to the fourth metal layer. As a result, the display panel realizes low-frequency display and has a stable display effect; and meanwhile, the power consumption of the pixel driving circuits is reduced.

It can be appreciated that for those of ordinary skill in the art, equivalent substitutions or changes can be made according to the technical solutions and inventive concepts of the present application, and all these changes or substitutions shall fall within the protection scope of the appended claims of the present application.

What is claimed is:

1. A display panel, comprising:

a substrate; and a pixel driving circuit layer comprising a plurality of pixel driving circuits, wherein each of the pixel driving circuits comprises a first capacitor and a second capacitor, wherein the pixel driving circuit layer comprises: a first semiconductor layer, a first metal layer, a second metal layer, a second semiconductor layer, a third metal layer, and a fourth metal layer stacked on the substrate in sequence;

wherein the fourth metal layer comprises a first source, a first drain, a second source, and a second drain, the first source and the first drain are electrically connected to the first semiconductor layer, the second source and the second drain are electrically connected to the second semiconductor layer, and the second semiconductor layer is an oxide semiconductor layer; and wherein each of the first capacitor and the second capacitor has a capacitor electrode disposed in the second metal layer, wherein the first metal layer comprises a first capacitor electrode, and the second metal layer comprises a second capacitor electrode; or the second metal layer comprises the first capacitor electrode, and the third metal layer comprises the second capacitor electrode; and wherein the first capacitor electrode and the second capacitor electrode form the first capacitor, and the second capacitor electrode is electrically connected to the fourth metal layer, wherein the display panel further comprises a first interlayer dielectric layer disposed between the second metal layer and the second semiconductor layer, a third insulating layer disposed between the second semiconductor layer and the third metal layer, and a second interlayer dielectric layer disposed between the third metal layer and the fourth metal layer, wherein the display panel is provided with a first via hole penetrating through the second interlayer dielectric layer, the third insulating layer, and the first interlayer dielectric layer; and wherein the fourth metal layer is electrically connected to the second capacitor electrode through the first via hole.

2. The display panel according to claim 1, wherein the display panel is provided with a first via hole penetrating through the second interlayer dielectric layer; and wherein the fourth metal layer is electrically connected to the second capacitor electrode through the first via hole.

3. The display panel according to claim 1, wherein the display panel further comprises a first insulating layer disposed between the first semiconductor layer and the first metal layer, and a second insulating layer disposed between the first metal layer and the second metal layer; and wherein the first metal layer further comprises a first gate and a third capacitor electrode, the second metal layer further comprises a fourth capacitor electrode, and the third metal layer further comprises a third gate, wherein the third capacitor electrode and the fourth capacitor electrode form the second capacitor.

4. The display panel according to claim 1, wherein the display panel further comprises a third semiconductor layer spaced apart from and disposed in a same layer as the second semiconductor layer, and the third semiconductor layer is electrically connected to the fourth metal layer; and wherein a projection of the third semiconductor layer on the substrate at least partially overlaps a projection of an overlapping area between the first capacitor electrode and the second capacitor electrode on the substrate.

5. The display panel according to claim 4, wherein the first semiconductor layer is a polysilicon semiconductor layer, and the third semiconductor layer is an oxide semiconductor layer.

6. The display panel according to claim 1, wherein the display panel further comprises a plurality of light-emitting devices arranged in an array and a pixel driving circuit for driving the light-emitting devices to emit light, and the pixel driving circuit comprises a first initialization transistor, a switching transistor, a driving transistor, a compensation transistor, a second initialization transistor, a first light-emitting control transistor, a second light-emitting control transistor, the first capacitor, and the second capacitor;

wherein a gate of the driving transistor is connected to a first node, a first terminal of the driving transistor is connected to a third node, and a second terminal of the driving transistor is connected to a second node;

a gate of the switching transistor is connected to a second scan signal, a first terminal of the switching transistor is connected to the data signal, and a second terminal of the switching transistor is connected to the second node;

a gate of the compensation transistor is connected to the second scan signal, a first terminal of the compensation transistor is connected to the third node, and a second terminal of the compensation transistor is connected to the first node;

a gate of the first initialization transistor is connected to a first scan signal, a first terminal of the first initialization transistor is connected to a second initialization signal, and a second terminal of the first initialization transistor is connected to the first node;

a gate of the first light-emitting control transistor is connected to a light-emitting control signal, a first terminal of the first light-emitting control transistor is connected to a fifth node, a second terminal of the first light-emitting control transistor is connected to the second node, and the first light-emitting control transistor is connected to a power high-potential signal line through the fifth node;

a gate of the second light-emitting control transistor is connected to the light-emitting control signal, a first terminal of the second light-emitting control transistor is connected to the third node, and a second terminal of the second light-emitting control transistor is connected to a fourth node;

a gate of the second initialization transistor is connected to the second scan signal, a first terminal of the second initialization transistor is connected to the fourth node, and a second terminal of the second initialization transistor is connected to a first initialization signal;

a first capacitor electrode of the first capacitor is connected to the gate of the switching transistor, and a second capacitor electrode of the first capacitor is connected to the first node; and a third capacitor electrode of the second capacitor is connected to the fifth node, a fourth capacitor electrode of the second capacitor is connected to the first node, and the second capacitor is connected to the power high-potential signal line through the fifth node.

7. The display panel according to claim 6, wherein the compensation transistor, the first initialization transistor, and the second initialization transistor are oxide transistors; and the switching transistor, the driving transistor, the first light-emitting control transistor, and the second light-emitting control transistor are low temperature polysilicon transistors.

8. A display panel, wherein the display panel comprises a plurality of light-emitting devices arranged in an array and a pixel driving circuit for driving the light-emitting devices to emit light, and the pixel driving circuit comprises:

a first initialization transistor configured to input a second initialization signal to a first node under control of a first scan signal;

a switching transistor configured to input a data signal to a second node under control of a second scan signal;

a driving transistor for driving the light-emitting devices to emit light under control of potentials of the first node and the second node;

a compensation transistor connected to the driving transistor through the first node and a third node, and configured to compensate a threshold voltage of the driving transistor under control of a third scan signal;

a second initialization transistor configured to input a first initialization signal to an anode of the light-emitting devices under control of the second scan signal;

a first light-emitting control transistor connected to the driving transistor through the second node, and configured to turn on a current flowing from a power high-potential signal line to the driving transistor under control of a light-emitting control signal;

a second light-emitting control transistor connected to the driving transistor through the third node, and configured to turn on a current flowing from the driving transistor to the anode of the light-emitting devices under control of the light-emitting control signal;

a first capacitor coupled between the first node and a gate of the switching transistor, and configured to reduce the potential of the first node; and a second capacitor connected to the driving transistor through the first node, and connected to the power high-potential signal line through a fourth node, and configured to store the data signal, wherein the first capacitor comprises a first capacitor electrode and a second capacitor electrode disposed opposite to each other, the first capacitor electrode is electrically connected to the gate of the switching transistor, and the second capacitor electrode is electrically connected to the first initialization transistor through the first node, wherein the switching transistor is a low temperature polysilicon transistor, and the first initialization transistor is an oxide transistor, wherein the display panel further comprises a substrate and a pixel driving circuit layer disposed on the substrate, the pixel driving circuit layer including a plurality of pixel driving circuits;

wherein the pixel driving circuit layer comprises: a first semiconductor layer, a first metal layer, a second metal layer, a second semiconductor layer, a third metal layer, and a fourth metal layer stacked on the substrate in sequence; wherein the fourth metal layer comprises a first source, a first drain, a second source, and a second drain, the first source and the first drain are electrically connected to the first semiconductor layer, the second source and the second drain are electrically connected to the second semiconductor layer, and the second semiconductor layer is an oxide semiconductor layer;

wherein each of the first capacitor and the second capacitor has a capacitor electrode disposed in the second metal layer, wherein the first metal layer comprises the first capacitor electrode, and the second metal layer comprises the second capacitor electrode; or the second metal layer comprises the first capacitor electrode, and the third metal layer comprises the second capacitor electrode; and wherein the first capacitor electrode and the second capacitor electrode form the first capacitor, and the second capacitor electrode is electrically connected to the fourth metal layer, wherein the display panel further comprises a first interlayer dielectric layer disposed between the second metal layer and the second semiconductor layer, a third insulating layer disposed between the second semiconductor layer and the third metal layer, and a second interlayer dielectric layer disposed between the third metal layer and the fourth metal layer, wherein the display panel is provided with a first via hole penetrating through the second interlayer dielectric layer, the third insulating layer, and the first interlayer dielectric layer; and wherein the fourth metal layer is electrically connected to the second capacitor electrode through the first via hole.

9. The display panel according to claim 8, wherein a gate of the driving transistor is connected to the first node, a first terminal of the driving transistor is connected to the third node, and a second terminal of the driving transistor is connected to the second node;

the gate of the switching transistor is connected to a second scan signal, a first terminal of the switching transistor is connected to the data signal, and a second terminal of the switching transistor is connected to the second node;

a gate of the compensation transistor is connected to the second scan signal, a first terminal of the compensation transistor is connected to the third node, and a second terminal of the compensation transistor is connected to the first node;

a gate of the first initialization transistor is connected to the first scan signal, a first terminal of the first initialization transistor is connected to the second initialization signal, and a second terminal of the first initialization transistor is connected to the first node;

a gate of the first light-emitting control transistor is connected to the light-emitting control signal, a first terminal of the first light-emitting control transistor is connected to a fifth node, a second terminal of the first light-emitting control transistor is connected to the second node, and the first light-emitting control transistor is connected to the power high-potential signal line through the fifth node;

a gate of the second light-emitting control transistor is connected to the light-emitting control signal, a first terminal of the second light-emitting control transistor is connected to the third node, and a second terminal of the second light-emitting control transistor is connected to the fourth node;

a gate of the second initialization transistor is connected to the second scan signal, a first terminal of the second initialization transistor is connected to the fourth node, and a second terminal of the second initialization transistor is connected to the first initialization signal;

the first capacitor electrode of the first capacitor is connected to the gate of the switching transistor, and the second capacitor electrode of the first capacitor is connected to the first node; and a third capacitor electrode of the second capacitor is connected to the fifth node, a fourth capacitor electrode of the second capacitor is connected to the first node, and the second capacitor is connected to the power high-potential signal line through the fifth node.

10. The display panel according to claim 9, wherein the compensation transistor and the second initialization transistor are oxide transistors; and the driving transistor, the first light-emitting control transistor, and the second light-emitting control transistor are low temperature polysilicon transistors.

11. The display panel according to claim 8, wherein the display panel is provided with a first via hole penetrating through the second interlayer dielectric layer; and wherein the fourth metal layer is electrically connected to the second capacitor electrode through the first via hole.

12. The display panel according to claim 8, wherein the display panel further comprises a second insulating layer disposed between the first semiconductor layer and the first metal layer, and the third insulating layer disposed between the first metal layer and the second metal layer; and wherein the first metal layer further comprises a first gate and a third capacitor electrode, the second metal layer further comprises a fourth capacitor electrode, and the third metal layer further comprises a third gate, wherein the third capacitor electrode and the fourth capacitor electrode form the second capacitor.

13. The display panel according to claim 8, wherein the display panel further comprises a third semiconductor layer spaced apart from and disposed in a same layer as the second semiconductor layer, and the third semiconductor layer is electrically connected to the fourth metal layer; and wherein a projection of the third semiconductor layer on the substrate at least partially overlaps a projection of an overlapping area between the first capacitor electrode and the second capacitor electrode on the substrate.

14. A display panel, comprising:

a substrate; and a pixel driving circuit layer comprising a plurality of pixel driving circuits, wherein each of the pixel driving circuits comprises a first capacitor and a second capacitor, wherein the pixel driving circuit layer comprises: a first semiconductor layer, a first metal layer, a second metal layer, a second semiconductor layer, a third metal layer, and a fourth metal layer stacked on the substrate in sequence;

wherein the fourth metal layer comprises a first source, a first drain, a second source, and a second drain, the first source and the first drain are electrically connected to the first semiconductor layer, the second source and the second drain are electrically connected to the second semiconductor layer, and the second semiconductor layer is an oxide semiconductor layer; and wherein each of the first capacitor and the second capacitor has a capacitor electrode disposed in the second metal layer, wherein the first metal layer comprises a first capacitor electrode, and the second metal layer comprises a second capacitor electrode; or the second metal layer comprises the first capacitor electrode, and the third metal layer comprises the second capacitor electrode; and wherein the first capacitor electrode and the second capacitor electrode form the first capacitor, and the second capacitor electrode is electrically connected to the fourth metal layer, wherein the display panel further comprises a third semiconductor layer spaced apart from and disposed in a same layer as the second semiconductor layer, and the third semiconductor layer is electrically connected to the fourth metal layer; and wherein a projection of the third semiconductor layer on the substrate at least partially overlaps a projection of an overlapping area between the first capacitor electrode and the second capacitor electrode on the substrate.

15. The display panel according to claim 14, wherein the first semiconductor layer is a polysilicon semiconductor layer, and the third semiconductor layer is an oxide semiconductor layer.

* * * * *